(12) United States Patent
Yano et al.

(10) Patent No.: US 8,191,151 B2
(45) Date of Patent: May 29, 2012

(54) PRIVACY PROTECTION DEVICE, PRIVACY PROTECTION METHOD, AND RECORDING MEDIUM RECORDED WITH PRIVACY PROTECTION PROGRAM

(75) Inventors: Ai Yano, Kawasaki (JP); Tatsuro Matsumoto, Kawasaki (JP); Kazuo Sasaki, Kawasaki (JP); Masayuki Fukui, Kawasaki (JP); Eiichi Takahashi, Kawasaki (JP); Masahiro Hara, Kawasaki (JP); Yutaka Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 12/136,384

(22) Filed: Jun. 10, 2008

(65) Prior Publication Data

US 2009/0007278 A1    Jan. 1, 2009

(30) Foreign Application Priority Data

Jun. 27, 2007 (JP) ................................. 2007-169286

(51) Int. Cl.
*G06F 7/04* (2006.01)
*G06F 17/30* (2006.01)
*H04N 7/16* (2011.01)

(52) U.S. Cl. ....................................................... 726/26
(58) Field of Classification Search ................. 726/26
See application file for complete search history.

(56) References Cited

U.S. PATENT DOCUMENTS

2003/0182435 A1 * 9/2003 Redlich et al. ............... 709/229

FOREIGN PATENT DOCUMENTS

| JP | 2002-373200 | 12/2002 |
|---|---|---|
| JP | 2004-258872 | 9/2004 |
| JP | 2004-328310 | 11/2004 |
| JP | 2005-135017 | 5/2005 |
| JP | 2006-24060 | 1/2006 |
| JP | 2007-86902 | 4/2007 |

OTHER PUBLICATIONS

Japanese Office Action, mailed Aug. 13, 2009 and issued in corresponding Japanese Patent Application 2007-169286.

* cited by examiner

*Primary Examiner* — Kambiz Zand
*Assistant Examiner* — Stephen Sanders
(74) *Attorney, Agent, or Firm* — Staas & Halsey LLP

(57) ABSTRACT

A privacy protection device acquires provider location information and browser location information indicating the current location of a browser terminal used by a browser who intends to browse the content. The privacy protection device stores determination data for determining whether to mask privacy information included in the content. The privacy protection device determines whether to mask the privacy information by comparing the distance, which is calculated based on the current location of the provider terminal indicated by the provider location information and the current location of the browser terminal indicated by the browser location information, to the determination data stored in the determination data storage part. Finally, the privacy protection device edits the privacy information included in the content so that the privacy information is concealed from the browser when the privacy masking determination part determines to mask the privacy information.

13 Claims, 30 Drawing Sheets

FIG. 2

| DISTANCE BETWEEN CURRENT LOCATION OF PROVIDER TERMINAL AND CURRENT LOCATION OF BROWSER TERMINAL | CREATED LOCATION INFORMATION |
|---|---|
| LESS THAN 10 m | MASK |
| 10 m OR MORE AND LESS THAN 1 km | MASK |
| 1 km OR MORE | DO NOT MASK |

FIG. 3

[PRIVACY INFORMATION MASKING RULE]

| DISTANCE FROM BROWSER | CREATED LOCATION INFORMATION |
|---|---|
| SHORT DISTANCE (LESS THAN 10 m) | MASK ▼ |
| MIDDLE DISTANCE (10 m OR MORE AND LESS THAN 1 km) | MASK ▼ |
| LONG DISTANCE (1 km OR MORE) | MASK ▼ |

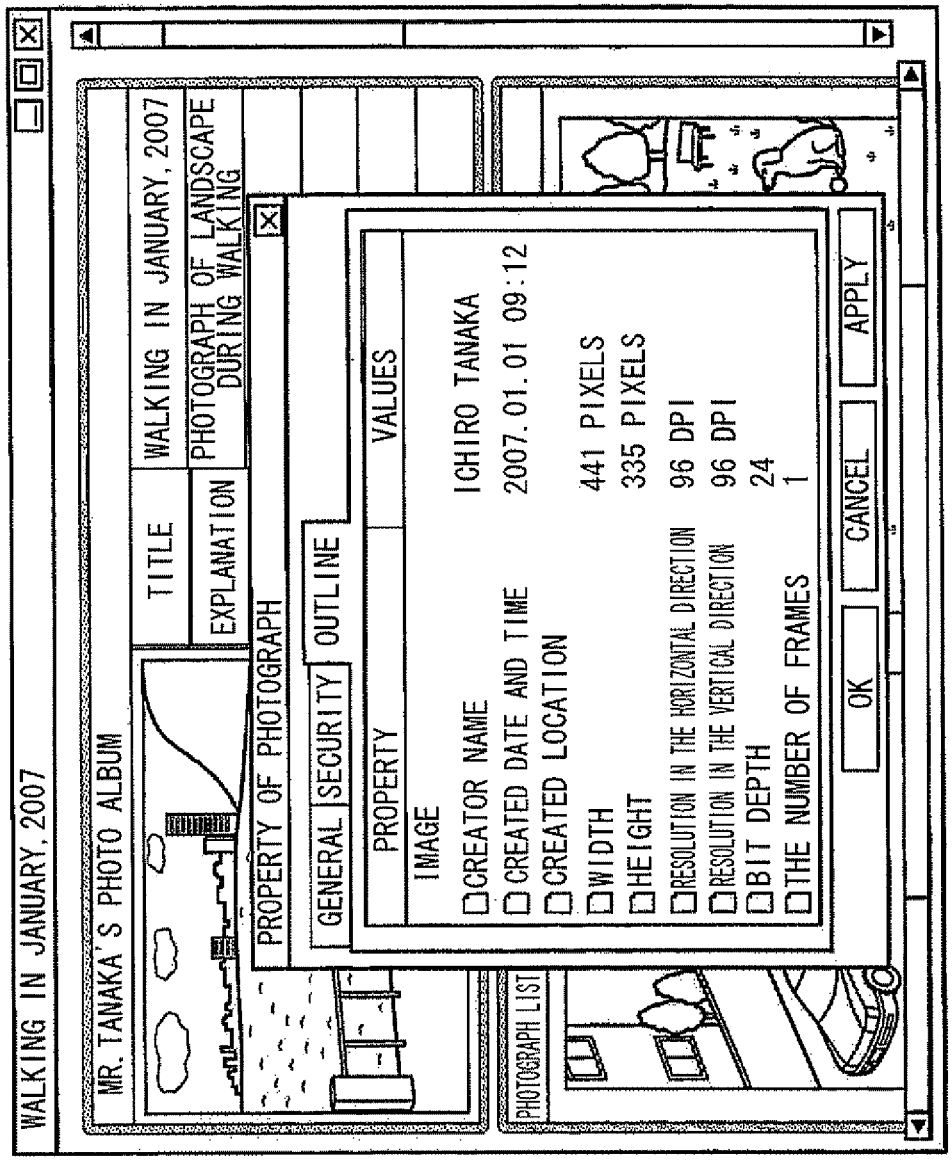

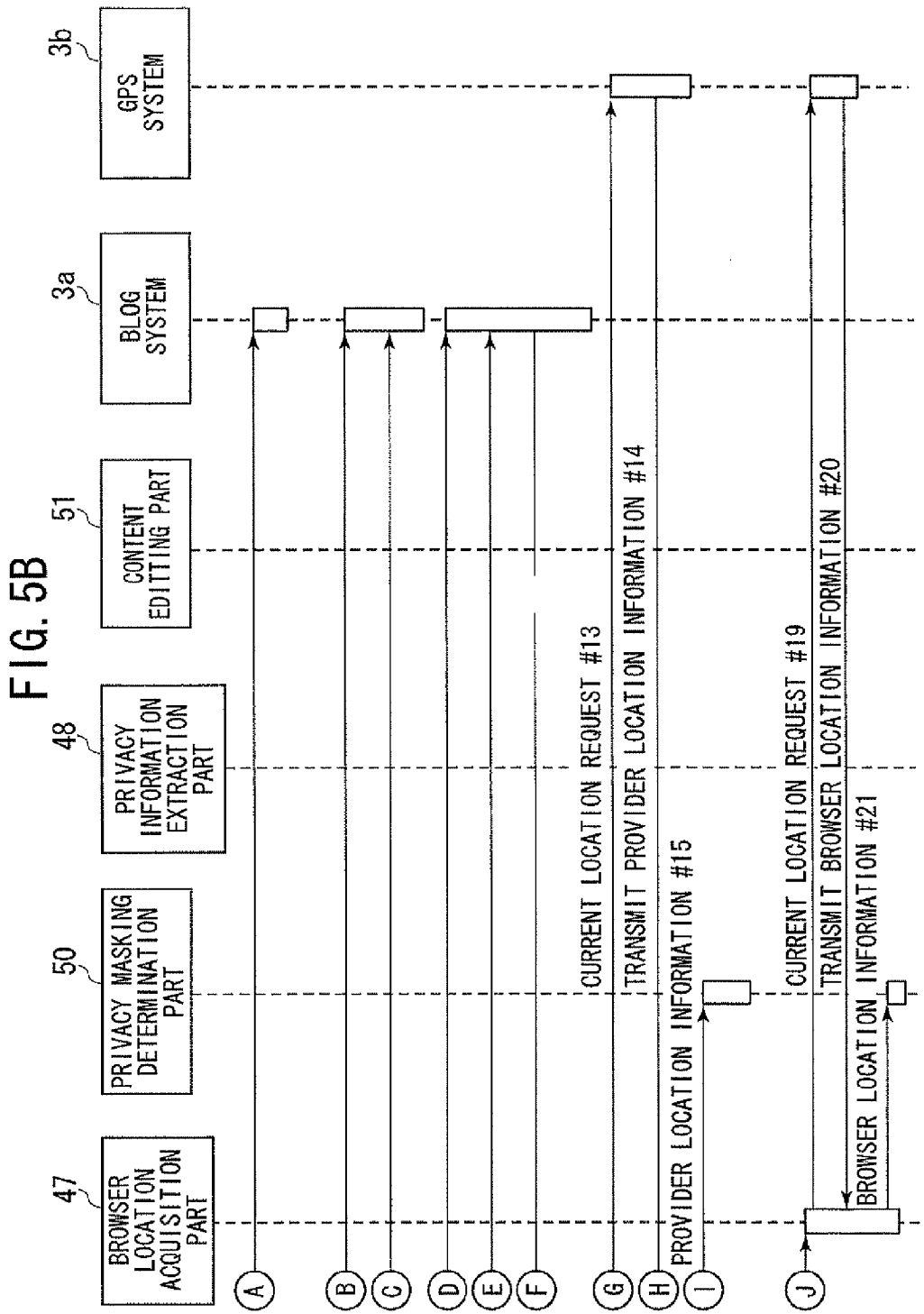

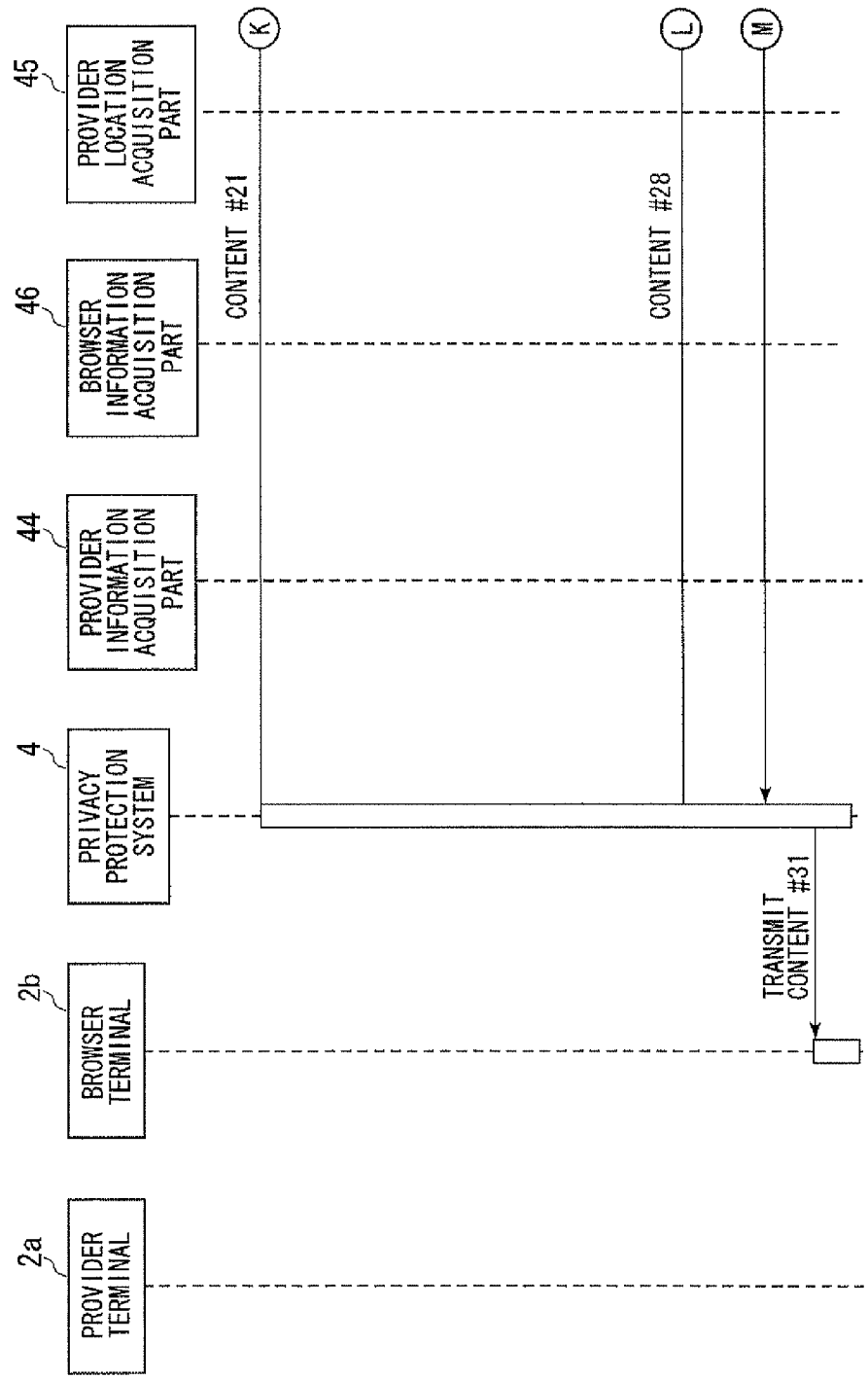

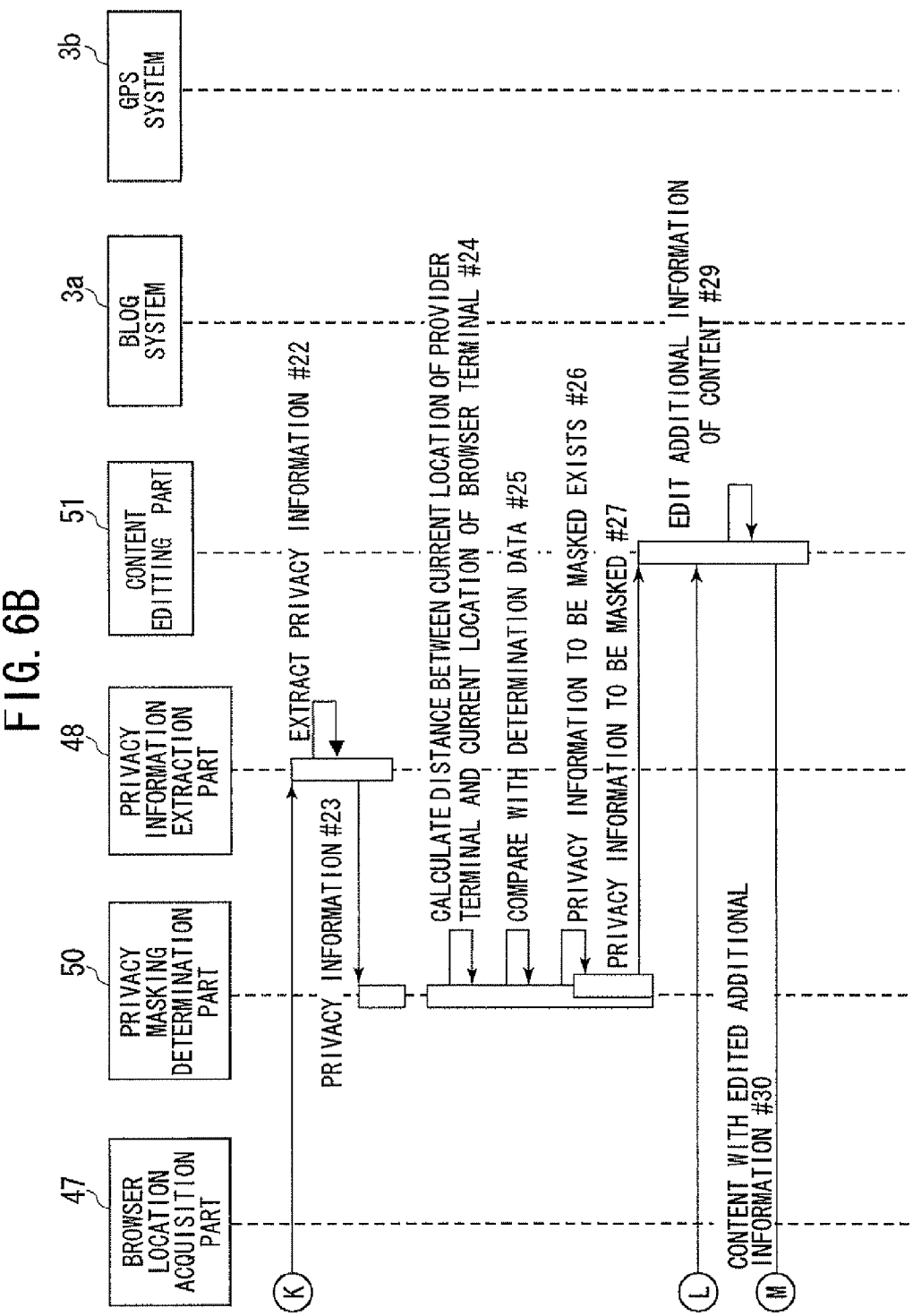

FIG. 8

| RADIUS OF CIRCLE INCLUDING CURRENT LOCATION OF PROVIDER TERMINAL, CURRENT LOCATION OF BROWSER TERMINAL, AND CREATED POSITION OF CONTENT | CREATED LOCATION INFORMATION |
|---|---|
| LESS THAN 10 m | MASK |
| 10 m OR MORE AND LESS THAN 1 km | MASK |
| 1 km OR MORE | DO NOT MASK |

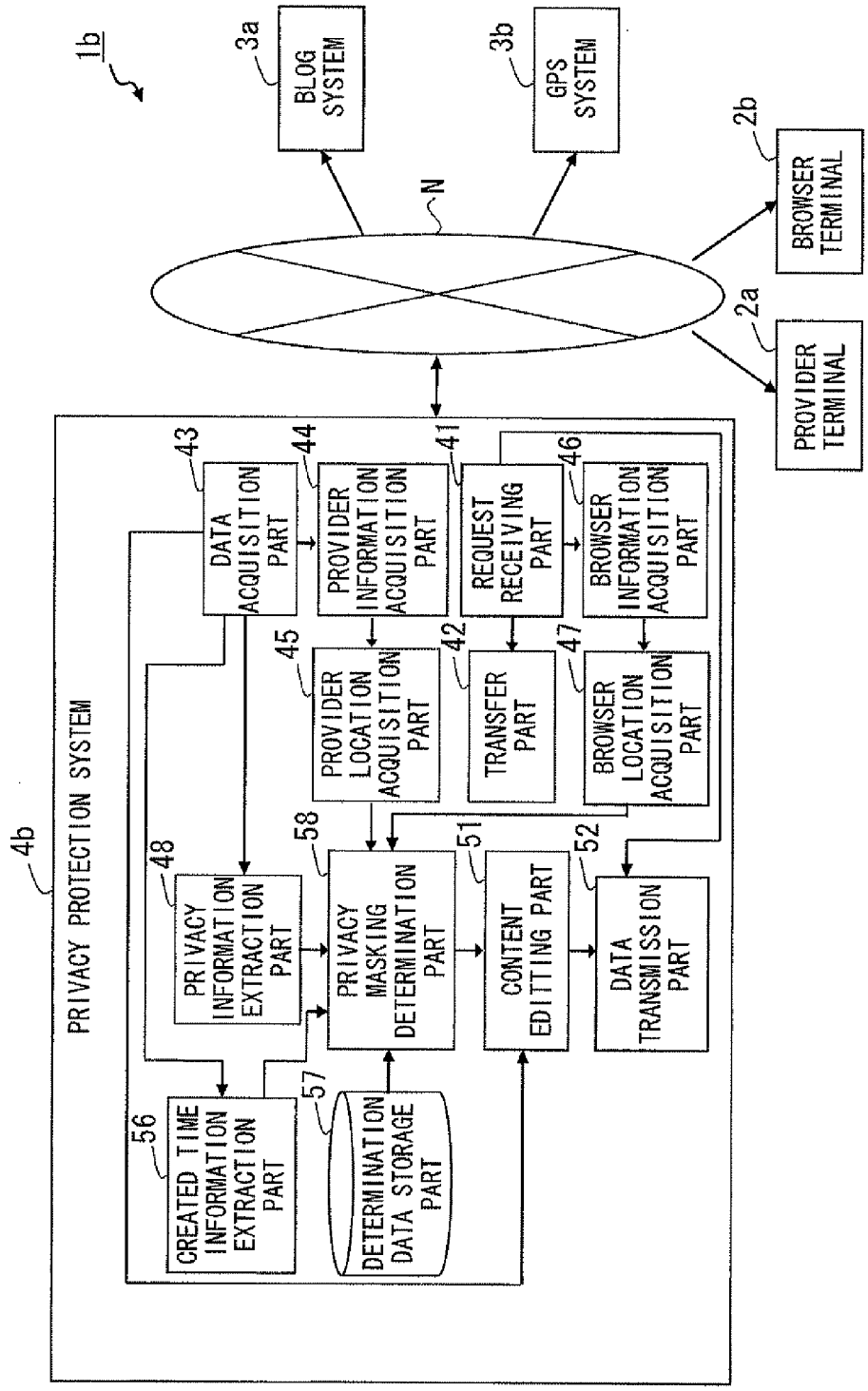

FIG. 11

| DISTANCE BETWEEN CURRENT LOCATION OF PROVIDER TERMINAL AND CURRENT LOCATION OF BROWSER TERMINAL | ELAPSED TIME FROM CREATED TIME TO CURRENT TIME | CREATED TIME INFORMATION |
|---|---|---|
| LESS THAN 10 m | SHORT TIME | MASK |
|  | MIDDLE TIME | MASK |
|  | LONG TIME | DO NOT MASK |
| 10 m OR MORE AND LESS THAN 1 km | SHORT TIME | MASK |
|  | MIDDLE TIME | MASK |
|  | LONG TIME | DO NOT MASK |
| 1 km OR MORE | SHORT TIME | DO NOT MASK |
|  | MIDDLE TIME | DO NOT MASK |
|  | LONG TIME | DO NOT MASK |

FIG. 13

| | 2007/03/01 | | 2007/03/02 | |
|---|---|---|---|---|
| | ... | ... | ... | ... |
| $T_1$ | 07:00 | 1111.2222, N, 3333.4444, E | 07:00 | ... |
| | 07:05 | 1111.2345, N, 3333.4567, E | 07:05 | ... |
| | 07:10 | 1111.3456, N, 3333.5555, E | 07:10 | ... |
| | 07:15 | 1111.4444, N, 3333.6789, E | 07:15 | ... |
| | 07:20 | 1111.5432, N, 3333.7890, E | 07:20 | ... |
| | 07:25 | 1111.6482, N, 3333.9876, E | 07:25 | ... |
| | 07:30 | 1112.4862, N, 3332.1973, E | 07:30 | ... |
| | 07:35 | 1112.7913, N, 3332.2846, E | 07:35 | ... |
| | 07:40 | 1112.9999, N, 3332.7777, E | 07:40 | ... |
| | 07:45 | 1111.2222, N, 3333.4444, E | 07:45 | ... |
| | 07:50 | 1111.2222, N, 3333.4444, E | 07:50 | ... |
| | ... | ... | ... | ... |
| | 08:00 | 1111.2222, N, 3333.4444, E | 08:00 | ... |
| $T_2$ | 08:05 | 1234.1111, N, 3456.4444, E | 08:05 | ... |
| | 08:10 | 2345.3333, N, 4567.5555, E | 08:10 | ... |
| | 08:15 | 3456.4444, N, 5678.6666, E | 08:15 | ... |
| | 08:20 | 4567.5555, N, 6789.7777, E | 08:20 | ... |
| | 08:25 | 5678.6666, N, 7890.8888, E | 08:25 | ... |
| | 08:30 | 6789.7777, N, 8901.9999, E | 08:30 | ... |
| | 08:35 | 7890.8888, N, 9012.0000, E | 08:35 | ... |
| $T_3$ | 08:40 | 8888.8765, N, 9999.0000, E | 08:40 | ... |
| | 08:45 | 8888.8865, N, 9987.0000, E | 08:45 | ... |
| | 08:50 | 8888.8888, N, 9999.0000, E | 08:50 | ... |
| | ... | ... | ... | ... |

FIG. 14

| PERIOD OF TIME | PLACE OF DEPARTURE | PLACE PASSING THROUGH | PLACE OF ARRIVAL | ACTIVITY |
|---|---|---|---|---|
| MORNING: BEFORE COMMUTING EVENING/NIGHT: AFTER COMING HOME | HOME | — | HOME | WALKING |
| MORNING | HOME | NEAREST STATION | OFFICE | COMMUTING (GOING) |
| EVENING TO NIGHT | OFFICE/ ENRICHMENT CLASS | NEAREST STATION | HOME | COMMUTING (RETURNING) |
| EVENING TO NIGHT | OFFICE | — | ENRICHMENT CLASS | ENRICHMENT CLASS |
| — | HOME | SUPERMARKET | HOME | SHOPPING |
| ⋮ | ⋮ | ⋮ | ⋮ | ⋮ |

FIG. 15

| DISTANCE BETWEEN ROUTE OF DAILY ACTIVITY OF PROVIDER AND CURRENT LOCATION OF BROWSER TERMINAL | ELAPSED TIME FROM CREATED TIME TO CURRENT TIME | CREATED LOCATION INFORMATION CREATED TIME INFORMATION |
|---|---|---|
| LESS THAN 10 m | SHORT TIME | MASK |
| | MIDDLE TIME | MASK |
| | LONG TIME | DO NOT MASK |
| 10 m OR MORE AND LESS THAN 1 km | SHORT TIME | MASK |
| | MIDDLE TIME | MASK |
| | LONG TIME | DO NOT MASK |
| 1 km OR MORE | SHORT TIME | DO NOT MASK |
| | MIDDLE TIME | DO NOT MASK |
| | LONG TIME | DO NOT MASK |

FIG. 18

| PLACE OF STAY | 2007/04/01 | 2007/04/02 | 2007/04/03 |
|---|---|---|---|
| RANGE OF BUILDING OF HOME | 0:00~07:10 (07:10) | 0:00~07:00 (08:10) | ... |
| RANGE OF BUILDING OF OFFICE | 08:35~19:25 (10:50) | 08:50~20:10 (11:20) | ... |
| RANGE OF BUILDING OF ENRICHMENT CLASS | 20:00~22:15 (02:15) | — | ... |
| ... | | | ... |

FIG. 19

| DISTANCE CALCULATED BASED ON AREA OF HOME GROUND AND CURRENT LOCATION OF BROWSER TERMINAL | CREATED LOCATION INFORMATION |
|---|---|
| CURRENT LOCATION OF BROWSER IS WITHIN AREA OF HOME GROUND | MASK |
| CURRENT LOCATION OF BROWSER IS OUTSIDE THE AREA OF HOME GROUND, AND DISTANCE BETWEEN CURRENT LOCATION OF BROWSER AND CENTER POSITION OF AREA OF HOME GROUND IS LESS THAN 1km | MASK |
| CURRENT LOCATION OF BROWSER IS OUTSIDE THE AREA OF HOME GROUND, AND DISTANCE BETWEEN CURRENT LOCATION OF BROWSER AND CENTER POSITION OF AREA OF HOME GROUND IS 1km OR MORE | DO NOT MASK |

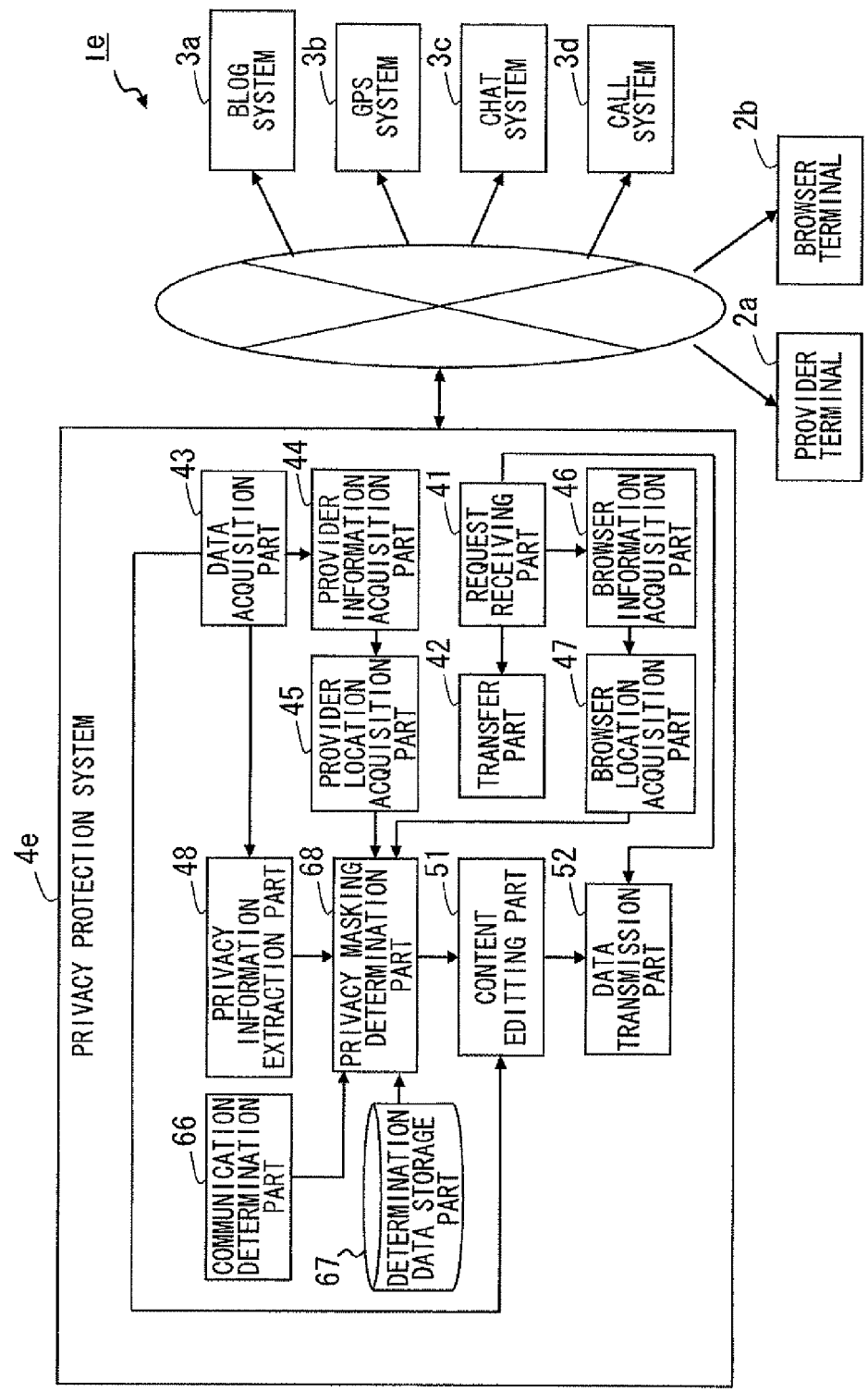

FIG. 22

| DISTANCE BETWEEN CURRENT LOCATION OF PROVIDER TERMINAL AND CURRENT LOCATION OF BROWSER TERMINAL | CREATED LOCATION INFORMATION |
|---|---|
| LESS THAN 10 m | COMMUNICATION EXISTS: DO NOT MASK |
| | COMMUNICATION DOES NOT EXIST: MASK |
| 10 m OR MORE AND LESS THAN 1 km | COMMUNICATION EXISTS: MASK |
| | COMMUNICATION DOES NOT EXIST: MASK |
| 1 km OR MORE | COMMUNICATION EXISTS: DO NOT MASK |
| | COMMUNICATION DOES NOT EXIST: DO NOT MASK |

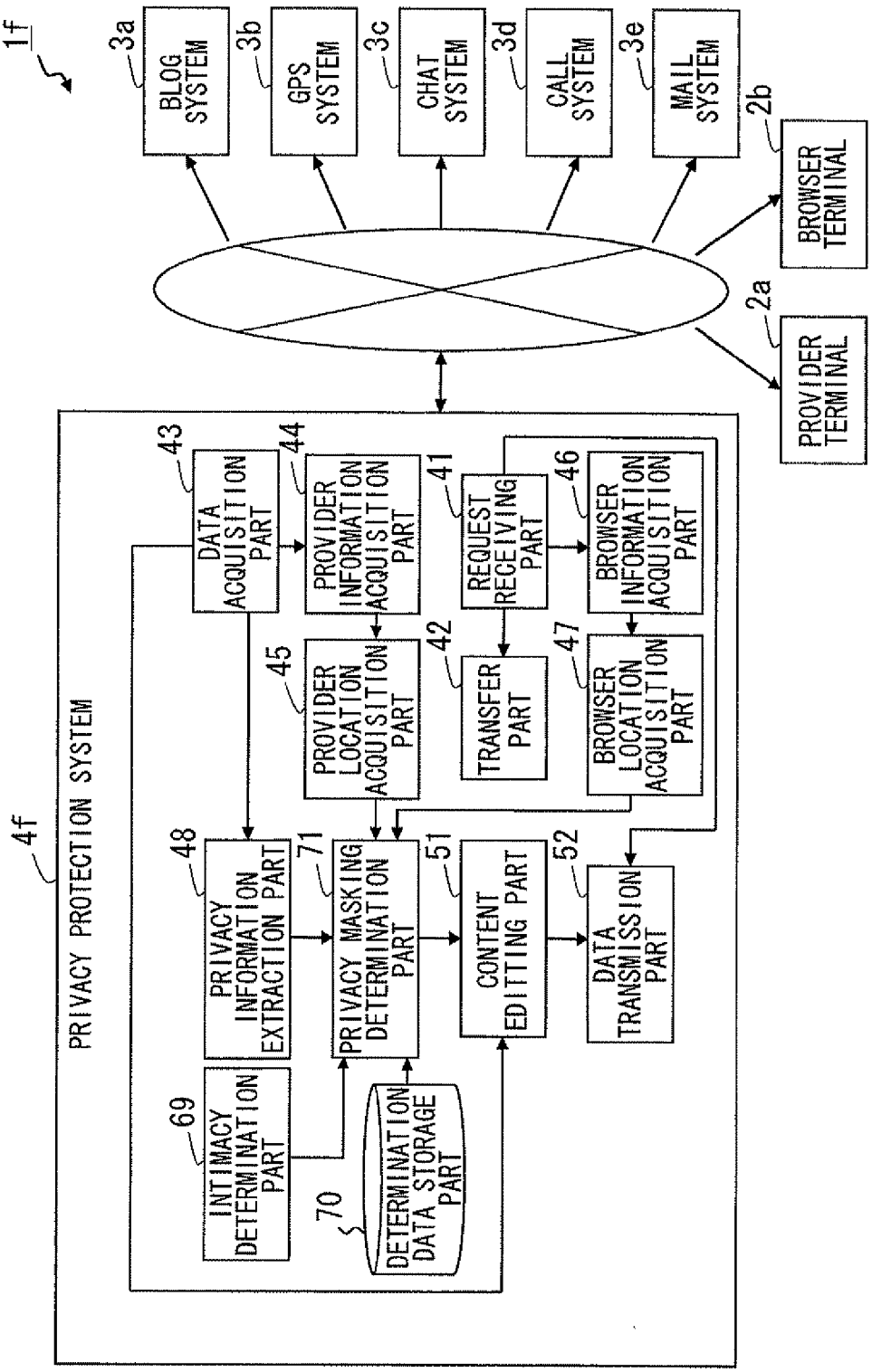

FIG. 24

| MEANS FOR COMMUNICATION | DEGREE OF INTIMACY: HIGH | DEGREE OF INTIMACY: MEDIUM | DEGREE OF INTIMACY: LOW |
|---|---|---|---|
| E-MAIL | TRANSMISSION/RECEPTION: ONCE OR MORE A WEEK | TRANSMISSION/RECEPTION: ONCE OR MORE A MONTH | TRANSMISSION/RECEPTION: FIVE TIMES OR LESS IN THE PAST |
| CHAT | CONVERSATION: ONCE OR MORE A WEEK | CONVERSATION: ONCE OR MORE A MONTH | CONVERSATION: FIVE TIMES OR LESS IN THE PAST |
| PHONE | PHONE CALL: ONCE OR MORE A WEEK | PHONE CALL: ONCE OR MORE A MONTH | PHONE CALL: FIVE TIMES OR LESS IN THE PAST |
| ... | ... | ... | ... |

FIG. 25

| DISTANCE BETWEEN CURRENT LOCATION OF PROVIDER TERMINAL AND CURRENT LOCATION OF BROWSER TERMINAL | CREATED LOCATION INFORMATION |
|---|---|
| LESS THAN 10 m | DEGREE OF INTIMACY HIGH: DO NOT MASK |
| | DEGREE OF INTIMACY MEDIUM: MASK |
| | DEGREE OF INTIMACY LOW: MASK |
| 10 m OR MORE AND LESS THAN 1 km | DEGREE OF INTIMACY HIGH: DO NOT MASK |
| | DEGREE OF INTIMACY MEDIUM: DO NOT MASK |
| | DEGREE OF INTIMACY LOW: MASK |
| 1 km OR MORE | DEGREE OF INTIMACY HIGH: DO NOT MASK |
| | DEGREE OF INTIMACY MEDIUM: DO NOT MASK |
| | DEGREE OF INTIMACY LOW: DO NOT MASK |

FIG. 27

| DISTANCE BETWEEN CURRENT LOCATION OF PROVIDER TERMINAL AND CURRENT LOCATION OF BROWSER TERMINAL | CREATED LOCATION INFORMATION |
|---|---|
| LESS THAN 10 m | MASK |
| 10 m OR MORE AND LESS THAN 1 km | DO NOT MASK |
| 1 km OR MORE | MASK |

PRIVACY PROTECTION DEVICE, PRIVACY PROTECTION METHOD, AND RECORDING MEDIUM RECORDED WITH PRIVACY PROTECTION PROGRAM

CROSS-REFERENCE TO RELATED APPLICATIONS

This application is based upon and claims the benefit of priority to the prior Japanese Patent Application No. 2007-169286, filed on Jun. 27, 2007, the entire contents of which are incorporated herein by reference.

BACKGROUND

1. Field

The present invention relates to a privacy protection device, a privacy protection method, and a recording medium recorded with a privacy protection program, and more particularly, to a security technology for protecting privacy information from misuse by a browser that has browsed the content, the privacy information included in the content and related to the privacy of a provider.

2. Description of the Related Art

Recently, cell phones are becoming equipped with functions that enable not only phone calls, but also connecting to the Internet to browse websites as well as transmit and receive e-mail. Particularly, use of cell phones as Internet terminals has been rapidly increasing in recent years. Cell phones have functions such as digital camera functions, executive functions of application software, and GPS functions (see, for example, Japanese Patent Laid-Open No. 2004-328310 or Japanese Patent Laid-Open No. 2002-373200). For example, cell phones having digital camera functions can photograph not only still images, but also moving images.

In accordance with the widespread use of such cell phones, a user can, for example, photograph specific buildings, landscapes, people, and so forth with a cell phone. The user can then transmit the photographed still images or moving images to an acquaintance or other people by e-mail. The user can also register the photographed still images or moving images to a blog system that manages blogs, thereby posting the photographed still images or moving images on the users blog. In this way, in recent years, a user can easily and readily handle contents such as still images, moving images, and voices.

By way of example, assuming that a user has photographed a specific landscape with a cell phone, in general, the cell phone automatically inserts additional information to the photographed still image (content) upon photographing of the specific landscape. The additional information includes, for example, creator name information, created time information, created location information, image width information, image height information, information of resolution in the horizontal direction of image, and information of resolution in the vertical direction of image.

Assuming that the user has registered the photographed still image to a blog system, a browser can, for example, easily browse the additional information included in the still image when the browser browses the still image posted on the blog. Specifically, the browser can browse the additional information by pointing the mouse pointer on the still image and right-clicking the image to open the property.

FIG. 28 is a schematic view showing an example of the additional information of the content displayed on a browser terminal used by the browser. As shown in FIG. 28, the browser terminal displays additional information such as the creator's name "Ichiro Tanaka", the creation date and time "2007.01.01. 09.12", the creation location "3653.0322, N, 13797.3792, E", image width "441 Pixels", the image height "355 pixels", though resolution in the horizontal direction "96 dpi", the resolution in the vertical direction "96 dpi", bit depth "24", and the number of frames In this way, the browser can easily browse the additional information included in the still image. Therefore, the browser can, for example, figure out other activities of the user (provider) who has provided the still image. For example, when the user uses a cell phone to photograph a plurality of landscapes in the travel destination and uses the cell phone to post the photographed plurality of still images on the user's blog, the browser can figure out the user's activities at the travel destination from the created date/time and the created location of the plurality of still images posted on the blog.

Furthermore, for example, when the user has posted the photographed still images on the user's blog in real time, the browser can figure out the current location of the user from the created date/time and created location of the still images posted on the blog. The browser can also identify the user from the creator name of the still images posted on the blog. The creator name information, the created time information, and the created location information are privacy information related to the privacy of the user. Therefore, a malicious browser who has browsed the privacy information may do harm to the user who has provided still images.

In order to solve such a problem, a method provided with a policy determination server in a system connected to the Internet (see, for example, Japanese Patent Laid-Open No. 2004-258872) is conventionally used as a method of controlling the disclosure of privacy information related to the privacy of a user. Specifically, policies describing the disclosure requirements and the like of the privacy information are stored in the policy determination server, and the system can control the disclosure of the privacy information in accordance with the policies stored in the policy determination server.

SUMMARY OF THE INVENTION

The conventional method described above controls the disclosure of the privacy information in accordance with the policies stored in the policy determination server. However, the method does not dynamically control the disclosure of the privacy information, included in the content, in accordance with the current location of the provider terminal being used by the provider who has provided the content and the current location of the browser terminal used by the browser who intends to browse the content.

In one aspect, a privacy protection device, a privacy protection method, and a recording medium are provided. The recording medium may be recorded with a privacy protection program capable of dynamically masking privacy information, included in the content, in accordance with the current location of a provider terminal being used by a provider of the content and the current location of a browser terminal used by a browser who intends to browse the content.

The privacy protection device comprises a provider location acquisition part acquiring provider location information indicating the current location of a provider terminal used by a provider of the content, a browser location acquisition part acquiring browser location information indicating the current location of a browser terminal used by a browser who intends to browse the content, a determination data storage part storing determination data serving as a standard for determining whether to mask privacy information included in the content, a privacy masking determination part determining whether to mask the privacy information by comparing the distance, which is calculated based on the current location of the provider terminal indicated by the provider location information and the current location of the browser terminal indicated by the browser location information, to the determination data stored in the determination data storage part, and a content editing part editing the privacy information included in the content so that the privacy information is concealed from the browser when the privacy masking determination part determines to mask the privacy information.

According to one aspect of the privacy protection device, the privacy masking determination part determines whether to mask the privacy information by comparing the distance, which is calculated based on the current location of the provider terminal and the current location of the browser terminal, to the determination data stored in the determination data storage part. The privacy information is, for example, creator name information, created time information, and created location information, and is included in the content or added as meta-information or the like.

The distance calculated based on the current location of the provider terminal and the current location of the browser terminal may be the distance between the current location of the provider terminal and the current location of the browser terminal, or may be the radius of a circle including the current location of the provider terminal and the current location of the browser terminal.

By way of example, the privacy masking determination part determines to mask the privacy information if the distance between the current location of the provider terminal and the current location of the browser terminal is a short distance, such as less than 10 m. This is because a malicious browser will likely do harm to the provider if the distance between the current location of the provider terminal and the current location of the browser terminal is a short distance.

On the other hand, the privacy masking determination part determines not to mask the privacy information if the distance between the current location of the provider terminal and the current location of the browser terminal is a long distance, such as 1 km or more. This is because a malicious browser will less likely do harm to the provider if the distance between the current location of the provider terminal and the current location of the browser terminal is a long distance.

The content editing part edits the privacy information included in the content so that the privacy information is concealed from the browser when the privacy masking determination part determines to mask the privacy information. This enables dynamic masking of the privacy information, included in the content, in accordance with the current location of the provider terminal used by the provider of the content and the current location of the browser terminal used by the browser who intends to browse the content.

An aspect of the privacy protection device further comprises a daily activity management part having an activity definition table recorded with the route of daily activity of the provider, wherein the privacy masking determination part further determines whether to mask the privacy information by comparing the distance, which is calculated based on the route of daily activity of the provider and the current location of the browser terminal indicated by the browser location information, to the determination data stored in the determination data storage part when determining not to mask the privacy information by comparing the distance, which is calculated based on the current location of the provider terminal indicated by the provider location information and the current location of the browser terminal indicated by the browser location information, to the determination data stored in the determination data storage part.

The privacy protection method comprises a provider location acquisition operation, by the provider location acquisition part included in a computer, of acquiring provider location information indicating the current location of the provider terminal used by the provider of the content, a browser location acquisition operation, by the browser location acquisition part included in the computer, of acquiring browser location information indicating the current location of the browser terminal used by the browser who intends to browse the content, a privacy masking determination operation, by the privacy masking determination part included in the computer, of determining whether to mask the privacy information by comparing the distance, which is calculated based on the current location of the provider terminal indicated by the provider location information and the current location of the browser terminal indicated by the browser location information, to the determination data stored in the determination data storage part storing the determination data serving as a standard for determining whether to mask the privacy information included in the content, and a content editing operation by the content editing part included in the computer, of editing the privacy information included in the content so that the privacy information is concealed from the browser when the privacy information is determined to be masked in the privacy masking determination operation.

The privacy protection program causes a computer to function with a provider location acquisition process for acquiring the provider location information indicating the current location of the provider terminal used by the provider of the content, a browser location acquisition process for acquiring the browser location information indicating the current location of the browser terminal used by the browser who intends to browse the content, a privacy masking determination process for determining whether to mask the privacy information by comparing the distance, which is calculated based on the current location of the provider terminal indicated by the provider location information and the current location of the browser terminal indicated by the browser location information, to the determination data stored in the determination data storage part storing the determination data serving as a standard for determining whether to mask the privacy information included in the content, and a content editing process for editing the privacy information included in the content so that the privacy information is concealed from the browser when the private information is determined to be masked in the privacy masking determination process.

The above-described embodiments of the present invention are intended as examples, and all embodiments of the present invention are not limited to including the features described above.

BRIEF DESCRIPTION OF THE DRAWINGS

FIG. 2 schematically depicts an example of determination data stored in a determination data storage part in a privacy protection system of the communication system;

FIG. 3 is a schematic view showing an example of setting the determination data displayed on a provider terminal in the communication system;

FIG. 4 is a schematic view showing an example of addition information of the content displayed on a browser terminal in the communication system;

FIG. 5A and FIG. 5B is a sequence diagram showing an example of the operation of the communication system;

FIG. 6A and FIG. 6B is a sequence diagram showing an example of the operation of the communication system;

FIG. 8 schematically depicts an example of the determination data stored in a determination data storage part in a privacy protection system of the communication system;

FIG. 10 is a block diagram showing a schematic configuration of a communication system according to a third embodiment of the present invention;

FIG. 11 schematically depicts an example of the determination data stored in a determination data storage part in a privacy protection system of the communication system;

FIG. 13 schematically depicts an example of provider location information recorded in a daily activity management part in a privacy protection system of the communication system;

FIG. 14 schematically depicts an example of activity definition rules recorded in the daily activity management part;

FIG. 15 schematically depicts an example of the determination data stored in a determination data storage part in a privacy protection system of the communication system;

FIG. 18 schematically depicts an example of the place of stay and the time of stay recorded in a home ground management part in a privacy protection system of the communication system;

FIG. 19 schematically depicts an example of the determination data stored in a determination data storage part in a privacy protection system of the communication system;

FIG. 21 is a block diagram showing a schematic configuration of a communication system according to a sixth embodiment of the present invention;

FIG. 22 schematically depicts an example of the determination data stored in a determination data storage part in a privacy protection system of the communication system;

FIG. 23 is a block diagram showing a schematic configuration of a communication system according to a seventh embodiment of the present invention;

FIG. 24 schematically depicts an example of intimacy determination rules recorded in an intimacy determination part in a privacy protection system of the communication system;

FIG. 25 schematically depicts an example of the determination data stored in a determination data storage part in the privacy protection system;

FIG. 27 schematically depicts an example of the determination data of the browser acquired by a determination data acquisition part in a privacy protection system of the communication system.

DETAILED DESCRIPTION OF THE PREFERRED EMBODIMENTS

Figure 1:
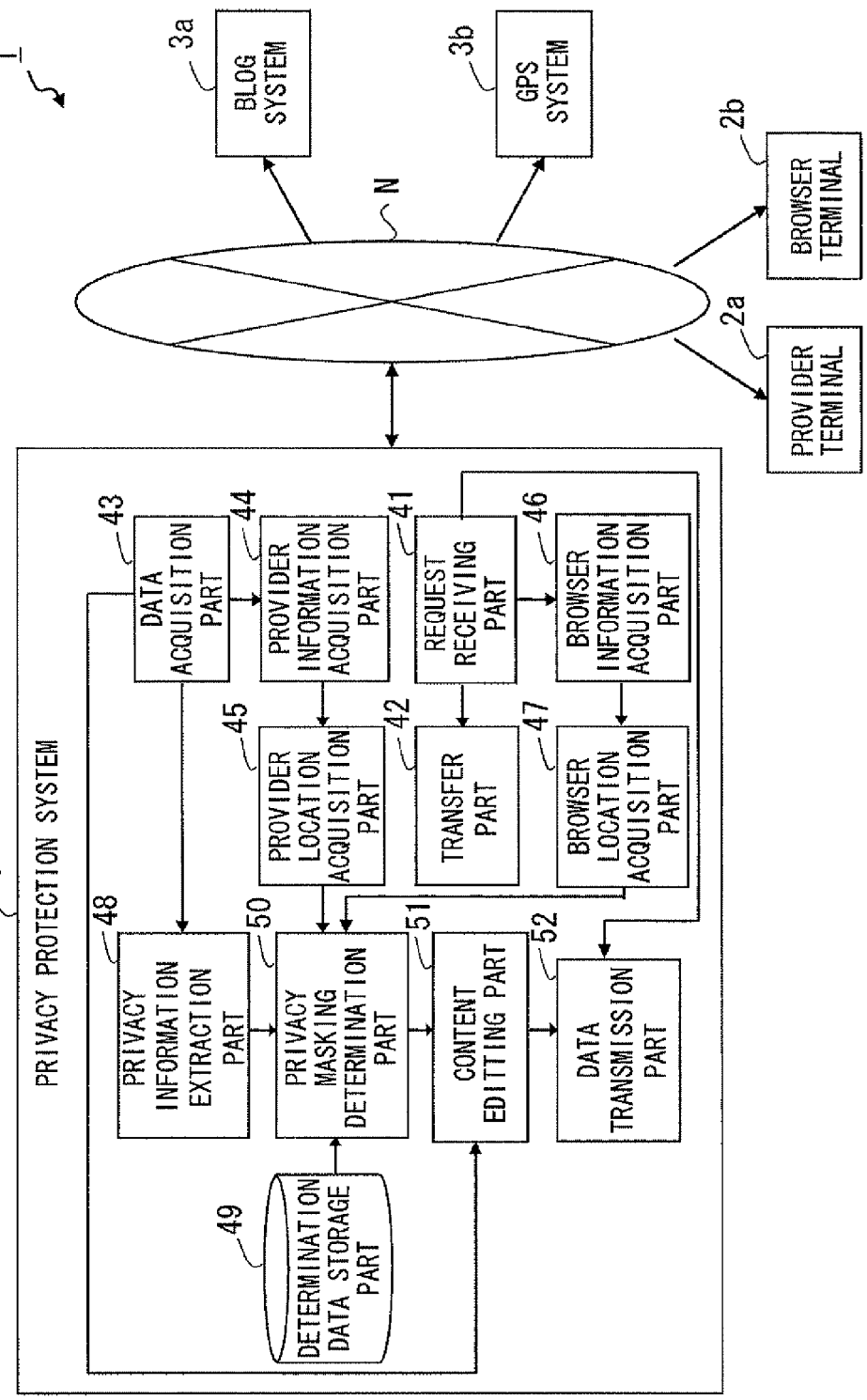
FIG. 1 is a block diagram showing a schematic configuration of a communication system according to a first embodiment of the present invention.

Reference may now be made in detail to embodiments of the present invention, examples of which are illustrated in the accompanying drawings, wherein like reference numerals refer to like elements throughout.

More specific embodiments of the present invention will now be described in detail with reference to the drawings.

First Embodiment

FIG. 1 is a block diagram showing a schematic configuration of a communication system 1 according to the present embodiment. More specifically, the communication system 1 according to the present embodiment comprises a provider terminal 2a, a browser terminal 2b, a blog system 3a, a GPS (Global Positioning System) system 3b, and a privacy protection system (privacy protection device) 4. The provider terminal 2a, the browser terminal 2b, the blog system 3a, the GPS system 3b, and the privacy protection system 4 are connected to each other via a network N. The network N is, for example, the Internet. The provider terminal 2a, the browser terminal 2b, the blog system 3a, the GPS system 3b, and the privacy protection system 4 can intercommunicate with a predetermined protocol such as TCP/IP (Transmission Control Protocol/Internet Protocol) and UDP/IP (User Datagram Protocol/Internet Protocol). The network N may be an Ethernet (registered trademark), a wireless LAN, or the like, instead of the Internet.

In FIG. 1, although one of each of the provider terminal 2a, the browser terminal 2b, the blog system 3a, the GPS system 3b, and the privacy protection system 4 are illustrated to simplify the description, the numbers of the provider terminal 2a, the browser terminal 2b, the blog system 3a, the GPS system 3b, and the privacy protection system 4 constituting the communication system 1 are arbitrary. Other terminal devices and various severs (Web server, mail server, homepage server, proxy server, DNS server, DHCP server, etc.) may reside in the communication system 1.

Configuration of Communication System

An overall configuration of the communication system 1 will be described, before describing a detailed configuration of the privacy protection system 4.

The provider terminal 2a is a terminal used by a provider, and is a terminal capable of registering (providing) the content to the blog system 3a through the network N. The content is constituted by arbitrary data including data (multimedia data or the like) such as still images, moving images, and voices, text data such as sentences, and layout data. Additional information such as creator name information, created time information, and created location information is included in the content. If the content is an still image, image width information, image height information, information of resolution in the horizontal direction of image, information of resolution in the vertical direction of image, and the like are further included in the additional information. When the provider terminal 2a generates the content (by photographing, for example), the provider terminal 2a automatically inserts or adds the additional information to the content.

The provider terminal 2a is, for example, a portable terminal such as a cell phone and a PDA (Personal Digital Assistance), or a personal computer. In the present embodiment, it is assumed that the provider terminal 2a is a cell phone. Therefore, the provider terminal 2a comprises, in addition to a phone call function, a website browsing function, an e-mail transmission/reception function, a digital camera function, a GPS function, and so forth. Having the GPS function, the provider terminal 2a transmits provider location information indicating the current location of the provider terminal 2a to the GPS system 3b in real time.

The browser terminal 2b is a terminal used by the browser and is a terminal capable of transmitting a browse request via the network N to the content registered in the blog system 3a. The browse request is transmitted in compliance with HTTP (Hyper Text Transfer Protocol). The browse request includes, for example, information of the browser, who is the sender, and the URL (Uniform Resource Locator) of the content. Information of the browser includes the IP address, MAC address, user ID, mail address, nickname, and the like of the browser terminal 2b.

Similar to the provider terminal 2a, the browser terminal 2b is constituted by, for example, a portable terminal such as a cell phone and a PDA, or a personal computer. In the present embodiment, it is assumed that the browser terminal 2b is a cell phone. Therefore, the browser terminal 2b comprises, in addition to the phone call function, a website browsing function, an e-mail transmission/reception function, a digital camera function, a GPS function, and so forth. Having the GPS function, the browser terminal 2b transmits browser location information indicating the current location of the browser terminal 2b to the GPS system 3b in real time.

In the present embodiment, it is assumed that the provider has photographed a specific landscape using the provider terminal 2a and registered the photographed still image to the blog system 3a with a providers comment (text data). It is also assumed that the browser has transmitted a browse request to the content registered in the blog system 3a using the browser terminal 2b in the present embodiment.

The blog system 3a is a system that manages a plurality of blogs. Specifically, the blog system 3a is registered with a plurality of sets of URLs, contents associated with the URLs, and information of the providers who have provided the contents. The information of the provider includes the IP address, MAC address, user ID, mail address, nickname, and the like of the provider terminal 2a. The blog system 3a has functions such as using RSS (RDF Site Summary) for automatically notifying the updates of the blogs and using a trackback function for quoting from other blogs or automatically setting the links.

The GPS system 3b acquires the provider location information transmitted from the provider terminal 2a. The GPS system 3b may be designed to dynamically acquire the provider location information by accessing the provider terminal 2a. Consequently, the information of the provider and the provider location information associated with the information of the provider are recorded in the GPS system 3b. The GPS system 3b also acquires the browser location information transmitted from the browser terminal 2b. The GPS system 3b may be designed to dynamically acquire the browser location information by accessing the browser terminal 2b. Consequently, the information of the browser and the browser location information associated with the information of the browser are recorded in the GPS system 3b.

An example has been described above in which the GPS system 3b acquires the provider location information from the provider terminal 2a and acquires the browser location information from the browser terminal 2b. However, the present invention is not limited to this. For example, the GPS system 3b may be designed to measure the current location of the provider terminal 2a using the trilateration method with wireless LAN access points to thereby acquire the provider location information. Similarly, the GPS system 3b may also be designed to measure the current location of the browser terminal 2b to acquire the browser location information in a similar way.

Configuration of Privacy Protection System

The privacy protection system 4 comprises a request receiving part 41, a transfer part 42, a data acquisition part 43, a provider information acquisition part 44, a provider location acquisition part 45, a browser information acquisition part 46, a browser location acquisition part 47, a privacy information extraction part 48, a determination data storage part 49, a privacy masking determination part 50, a content editing part 51, and a data transmission part 52.

The request receiving part 41 receives the browse request of the content transmitted from the browser terminal 2b. The request receiving part 41 outputs the received browse request to the transfer part 42, the browser information acquisition part 46, and the data transmission part 52.

The transfer part 42 transfers the browse request outputted from the request receiving part 41 to the blog system 3a. Consequently, the blog system 3a according to the present embodiment extracts the content indicated by the browse request transferred from the transfer part 42 from a plurality of contents registered in the blog system 3a. The blog system 3a transmits the extracted content to the privacy protection system 4 along with the information of the provider.

The data acquisition part 43 acquires the content transmitted from the blog system 3a. The data acquisition part 43 outputs the acquired content to the privacy information extraction part 48 and the content editing part 51. The data acquisition part 43 also acquires the information of the provider transmitted from the blog system 3a. The data acquisition part 43 outputs the acquired provider information to the provider information acquisition part 44.

The provider information acquisition part 44 acquires the information of the provider outputted from the data acquisition part 43. The provider information acquisition part 44 may be designed to acquire the information of the provider from login information transmitted from the provider terminal 2a. The provider information acquisition part 44 outputs the acquired information of the provider to the provider location acquisition part 45.

The provider location acquisition part 45 acquires the provider location information recorded in the GPS system 3b based on the information of the provider outputted from the provider information acquisition part 44. The provider location acquisition part 45 outputs the acquired provider location information to the privacy masking determination part 50 along with the information of the provider.

The browser information acquisition part 46 extracts the information of the browser from the browse request outputted from the request receiving part 41 and acquires the information of the browser. The browser information acquisition part 46 may be designed to acquire the information of the browser from the login information transmitted from the browser terminal 2b. The browser information acquisition part 46 outputs the acquired information of the browser to the browser location acquisition part 47.

The browser location acquisition part 47 acquires the browser location information recorded in the GPS system 3b based on the information of the browser outputted from the browser information acquisition part 46. The browser location acquisition part 47 outputs the acquired browser location information to the privacy masking determination part 50 along with the information of the browser.

The privacy information extraction part 48 extracts privacy information related to the privacy of the provider from the additional information included in the content. When a plurality of contents exists, the privacy information extraction part 48 extracts the privacy information from additional information included in each content. In the present embodiment, the privacy information extraction part 48 extracts the creator name information, the created time information, and the created location information from the additional information included in the content in accordance with a predetermined extraction standard. Thus, the creator name information, the created time information, and the created location information serve as the privacy information related to the privacy of the provider. The creator name information is a username registered in the terminal 2a of the provider who has created the content. The created time information is information indicating the created time of the content. The created location is information indicating the created location of the content. The predetermined extraction standard is recorded in a memory (not shown) of the privacy information extraction part 48 in advance. The privacy information extraction part 48 outputs the extracted privacy information to the privacy masking determination part 50.

The determination data storage part 49 stores determination data serving as a standard for determining whether to mask the created location information that is privacy information. FIG. 2 schematically depicts an example of the determination data stored in the determination data storage part 49 according to the present embodiment. In the example shown in FIG. 2, the determination data storage part 49 stores determination data indicating that the created location information is to be masked when the distance between the current location of the provider terminal 2a (current location of the provider) and the current location of the browser terminal 2b (current location of the browser) is less than 10 m. The determination data storage part 49 also stores determination data indicating that the created location information is to be masked when the distance between the current location of the provider terminal 2a and the current location of the browser terminal 2b is 10 m or more and less than 1 km. The determination data storage part 49 further stores determination data indicating that the created location information is not to be masked when the distance between the current location of the provider terminal 2a and the current location of the browser terminal 2b is 1 km or more. Although the determination data is schematically shown in FIG. 2 for convenience of description, in practice, the determination data storage part 49 stores the determination data as, for example, binary data so that the CPU of the privacy protection system 4 can process.

In the present embodiment, an example has been described in which only the determination data serving as a standard for determining whether to mask the created location information is stored in the determination data storage part 49. However, the present invention is not limited to this. For example, the determination data storage part 49 may store determination data serving as a standard for determining whether to mask the creator name information or the created time information.

In the present embodiment, the determination data stored in the determination data storage part 49 can be set up from the provider terminal 2a. FIG. 3 is a schematic view showing an example of setting the determination data displayed on the provider terminal 2a. As shown in FIG. 3, the provider terminal 2a displays "short distance (less than 10 m)", "middle distance (10 m or more and less than 1 km)", and "long distance (1 km or more)" as the distance from the browser. The provider terminal 2a displays "mask" as the disclosure level of the created location information, and the provider can shift to "do not mask" by operating the selection field (pull-down menu). Once the setting of the determination data by the provider is finished, the provider terminal 2a transmits the set determination data to the privacy protection system 4. As a result, new determination data is stored in the determination data storage part 49.

In the present embodiment, a configuration has been described in which one of "mask" and "do not mask" can be selected as the disclosure level of the created location information. However, the present invention is not limited to this. For example, the provider may be able to operate and set up the distance between the provider terminal 2a and the browser terminal 2b. In addition, not only the disclosure level of the created location information, but also the disclosure level of the creator name information or the disclosure level of the created time information may be able to be set up. In this case, the disclosure levels of the creator name information, the created time information, and the created location information may be set up individually, or the disclosure levels of the creator name information, the created time information, and the created location information may be set up collectively.

The privacy masking determination part 50 determines whether to mask the privacy information by comparing the distance, which is calculated based on the current location of the provider terminal 2a indicated by the provider location information and the current location of the browser terminal 2b indicated by the browser location information, to the determination data stored in the determination data storage part 49. Specifically, the privacy masking determination part 50 calculates the distance between the current location of the provider terminal 2a and the current location of the browser terminal 2b. The privacy masking determination part 50 determines whether there is privacy information outputted from the privacy information extraction part 48 that should be masked by comparing the calculated distance to the determination data shown in FIG. 2.

It is assumed that the distance between the current location of the provider terminal 2a and the current location of the browser terminal 2b is 8 m in the present embodiment. In this case, the privacy masking determination part 50 determines that, among the creator name information, the created time information, and the created location information outputted from the privacy information extraction part 48, the created location information is the privacy information that should be masked by comparing the calculated distance 8 m to the determination data shown in FIG. 2. The privacy masking determination part 50 outputs the privacy information determined to be masked (created location information) to the content editing part 51.

In the present embodiment, an example has been described in which the privacy masking determination part 50 determines whether there is privacy information that should be masked by comparing the distance between the current location of the provider terminal 2a and the current location of the browser terminal 2b to the determination data shown in FIG. 2. However, the present invention is not limited this. For example, the privacy masking determination part 50 may be designed to compare the radius of a circle including the current location of the provider terminal 2a and the current location of the browser terminal 2b to the determination data shown in FIG. 2 to determine whether there is privacy information that should be masked.

The content editing part 51 edits the additional information included in the content so that the privacy information outputted from the privacy masking determination part 50 is concealed from the browser. In the present embodiment, the content editing part 51 deletes the privacy information outputted from the privacy masking determination part 50 from the additional information included in the content. In the present embodiment, the privacy information outputted from the privacy masking determination part 50 is the created location information, and thus, the content editing part 51 deletes the created location information from the additional information included in the content. This enables to conceal the privacy information from the browser. The content editing part 51 outputs the edited content to the data transmission part 52.

In the present embodiment, an example has been described in which the content editing part 51 deletes the created location information from the additional information included in the content. However, the present invention is not limited to this. For example, the content editing part 51 may be designed to include an inclusive area generating part. More specifically, the inclusive area generating part extracts the created location information from the additional information included in each of the contents when a plurality of contents exists. The inclusive area generating part calculates an area that includes all created locations of the content, the locations indicated by the extracted created location information. The inclusive area generating part generates new location information that specifies the calculated area. For example, when the calculated area is a rectangle, the inclusive area generating part generates, for example, location information in the upper left and location information in the lower right that specify the area. The content editing part 51 replaces the created location information in the additional information included in the content with the location information generated by the inclusive area generating part. The content editing part 51 may be designed to replace the created location information in the additional information included in the content with, for example, the location information of an arbitrary landmark. Thus, the method of masking is not particularly limited as long as the content editing part 51 can edit the additional information included in the content so that the privacy information is concealed from the browser.

The data transmission part 52 transmits the content outputted from the content editing part 51 to the browser terminal 2b that has transmitted the browse request. As a result, the content transmitted from the data transmission part 52 is displayed on the browser terminal 2b. The browser can browse the additional information by, for example, pointing the mouse pointer on the still image of the displayed content and right-clicking the image to open the property.

FIG. 4 is a schematic view showing an example of the additional information of the content displayed on the browser terminal 2b used by the browser. As shown in FIG. 4, the browser terminal 2b displays additional information such as creator name "Ichiro Tanaka", created date and time "2007.01.01. 09:12", image width "441 pixels", image height "355 pixels", resolution in the horizontal direction "96 dpi", resolution in the vertical direction "96 dpi", bit depth "24", and the number of frames "1". Thus, in the present embodiment, the created location is not displayed on the browser terminal 2b as shown in FIG. 4 because the content editing part 51 has deleted the created location information from the additional information of the still image.

The privacy protection system 4 is also realized by installing a program on an arbitrary computer such as a personal computer. More specifically, the browse request receiving part 41, the transfer part 42, the data acquisition part 43, the provider information acquisition part 44, the provider location acquisition part 45, the browser information acquisition part 46, the browser location acquisition part 47, the privacy information extraction part 48, the privacy masking determination part 50, the content editing part 51, and the data transmission part 52 are embodied by the CPU of a computer operating in accordance with a program that realizes the functions. Therefore, the program for realizing the functions of the browse request receiving part 41, the transfer part 42, the data acquisition part 43, the provider information acquisition part 44, the provider location acquisition part 45, the browser information acquisition part 46, the browser location acquisition part 47, the privacy information extraction part 48, the privacy masking determination part 50, the content editing part 51, and the data transmission part 52 or a recording medium recorded with the program is also an embodiment of the present invention. The determination data storage part 49 is also embodied by a built-in storage device of a computer or a storage device accessible from the computer.

In the example shown in FIG. 1, an example has been described in which each of the blog system 3a, the GPS system 3b, and the privacy protection system 4 resides in different hardware. However the present invention is not limited to this. For example, the blog system 3a, the GPS system 3b, and the privacy protection system 4 may reside in the same hardware. The privacy protection system 4 may reside in the blog system 3a, and the privacy protection system 4 may reside in the GPS system 3b.

Operation of Communication System

The operation of the communication system 1 according to the configuration described above will now be described with reference to FIGS. 5 and 6. The privacy protection system 4 shown in FIGS. 5 and 6 include the request receiving part 41, the transfer part 42, the data acquisition part 43, and the data transmission part 52.

Figure 5A:
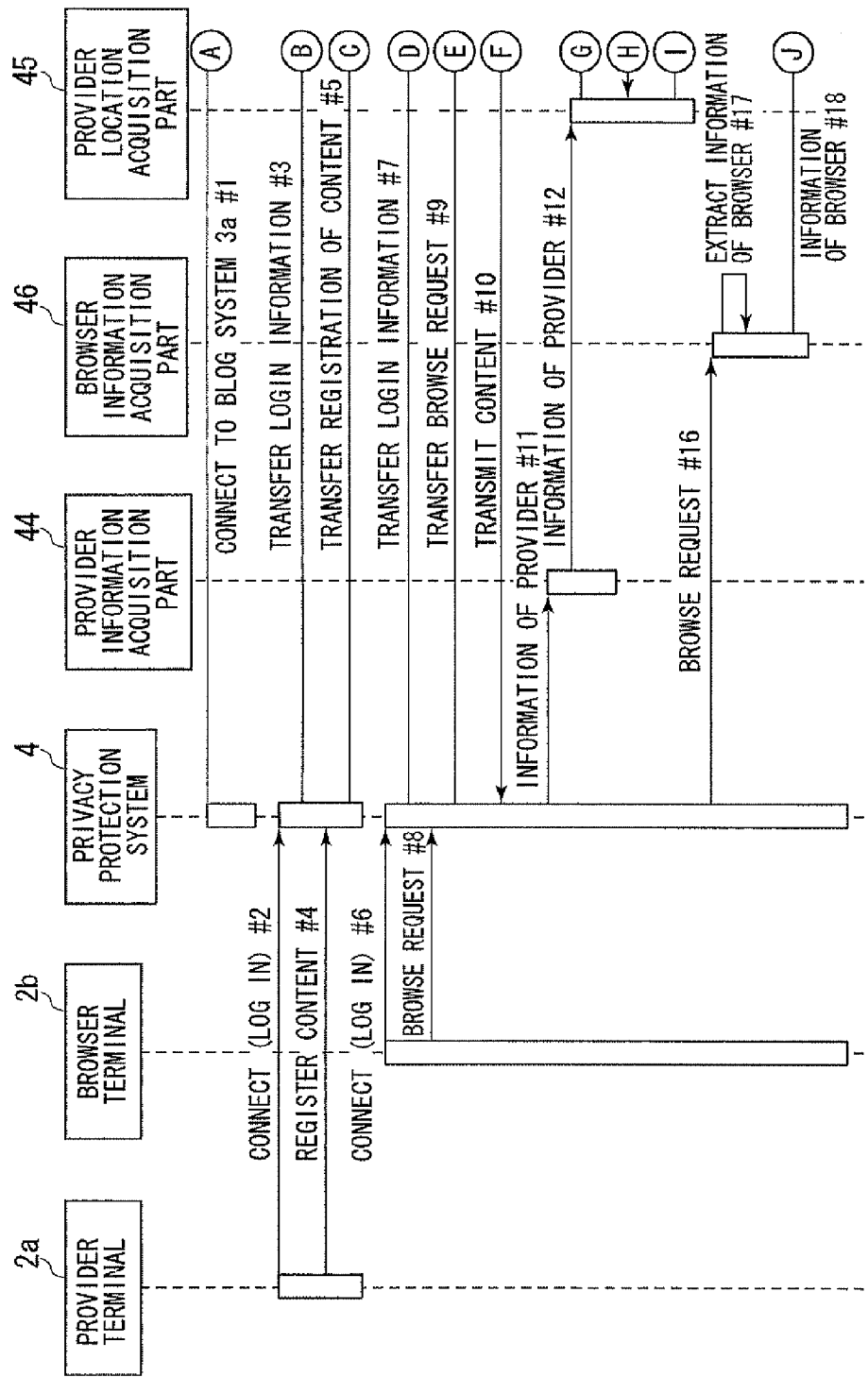

FIGS. 5 and 6 are sequence diagrams showing examples of the operation of the communication system 1. As shown in FIG. 5A and FIG. 5B, the privacy protection system 4 is connected to the blog system 3a by transmitting a connection request to the blog system 3a (#1). The connection to the blog system 3a in #1 means that the privacy protection system 4 becomes communicable to the blog system 3a.

The provider terminal 2a then transmits the login information to the privacy protection system 4 to log in to the blog system 3a (#2). The login information includes a password for logging in and the information of the provider. The request receiving part 41 of the privacy protection system 4 receives the login information transmitted in #2. The transfer part 42 of the privacy protection system 4 transfers the received login information to the blog system 3a (#3). This allows the provider terminal 2a and the blog system 3a to communicate each other through the privacy protection system 4.

The provider terminal 2a then transmits the registration request of the content to the privacy protection system 4 to register the content to the blog system 3a (#4). The request receiving part 41 of the privacy protection system 4 receives the registration request of the content transmitted in #4. The transfer part 42 of the privacy protection system 4 transfers the received registration request of the content to the blog system 3a (#5). Consequently, the content is registered to the blog system 3a.

The browser terminal 2b then transmits the login information to the privacy protection system 4 for logging in to the blog system 3 (#6). The login information includes a password for logging in and the information of the browser. The request receiving part 41 of the privacy protection system 4 receives the login information transmitted in #6. The transfer part 42 of the privacy protection system 4 transfers the received login information to the blog system 3a (#7). This allows the browser terminal 2b and the blog system 3a to communicate each other through the privacy protection system 4.

The browser terminal 2b then transmits the browse request to the content registered in the blog system 3a (#8). The request receiving part 41 of the privacy protection system 4 receives the browse request transmitted in #8. The transfer part 42 of the privacy protection system 4 transfers the received browse request to the blog system 3a (#9). The blog system 3a transmits the content indicated by the browse request transferred in #9 to the privacy protection system 4 along with the information of the provider (#10). The data acquisition part 43 of the privacy protection system 4 acquires the content transmitted in #10 and the information of the provider.

The data acquisition part 43 of the privacy protection system 4 outputs the acquired information of the provider to the provider information acquisition part 44 (#11). The provider information acquisition part 44 acquires the information of the provider outputted in #11. The provider information acquisition part 44 outputs the acquired information of the provider to the provider location acquisition part 45 (#12). The provider location acquisition part 45 transmits a current location request to the GPS system 3b to acquire the provider location information indicating the current location of the provider terminal 2a (#13). The current location request includes a request for acquiring the provider location information and the information of the provider. The GPS system 3b transmits the provider location information to the provider location acquisition part 45 in accordance with the current location request transmitted in #13 (#14). As a result, the provider location acquisition part 45 acquires the provider location information. The provider location acquisition part 45 outputs the acquired provider location information to the privacy masking determination part 50 (#15).

The request receiving part 41 of the privacy protection system 4 outputs the received browse request to the browser information acquisition part 46 (#16). The browser information acquisition part 46 extracts the information of the browser from the browse request outputted in #16 (#17). As a result, the browser information acquisition part 46 acquires the information of the browser. The browser information acquisition part 46 outputs the acquired information of the browser to the browser location acquisition part 47 (#18). The browser location acquisition part 47 transmits the current location request to the GPS system 3b to acquire the browser location information indicating the current location of the browser terminal 2b (#19).

The current location request includes the request for acquiring the browser location information and the information of the browser. The GPS system 3b transmits the browser location information to the browser location acquisition part 47 in accordance with the current location request transmitted in #19 (#20). As a result, the browser location acquisition part 47 acquires the browser location information. The browser location acquisition part 47 outputs the acquired browser location information to the privacy masking determination part 50 (#21).

As shown in FIG. 6A and FIG. 6B, the data acquisition part 43 of the privacy protection system 4 outputs the acquired content to the privacy information extraction part 48 (#21). The privacy information extraction part 48 extracts the privacy information related to the privacy of the provider from the additional information included in the content outputted in #21 (#22). In the present embodiment, the privacy information refers to the creator name information, the created time information, and the created location information. The privacy information extraction part 48 outputs the privacy information extracted in #22 to the privacy masking determination part 50 (#23).

The privacy masking determination part 50 calculates the distance between the current location of the provider terminal 2a indicated by the provider location information and the current location of the browser terminal 2b indicated by the browser location information (#24). The privacy masking determination part 50 determines whether there is privacy information that should be masked by comparing the distance calculated in #24 to the determination data stored in the determination data storage part 49 (#25). When the privacy masking determination part 50 determines that there is privacy information that should be masked (#26), the privacy masking determination part 50 outputs the privacy information that should be masked to the content editing part 51 (#27). In the present embodiment, the privacy masking determination part 50 outputs the created location information to the content editing part 51 as privacy information that should be masked.

The data acquisition part 43 of the privacy protection system 4 outputs the acquired content to the content editing part 51 (#28). The content editing part 51 edits the additional information included in the content outputted in #28 so that the privacy information outputted in #27 is concealed from browser (#29). The content editing part 51 outputs the content, in which the additional information is edited, to the data transmission part 52 of the privacy protection system 4 (#30). The data transmission part 52 of the privacy protection system 4 transmits the content outputted in #30 to the browser terminal 2b that has transmitted the browse request (#31).

As described, according to the privacy protection system 4 of the present embodiment, the privacy masking determination part 50 determines whether to mask the privacy information by comparing the distance, which is calculated based on the current location of the provider terminal 2a and the current location of the browser terminal 2b, to the determination data stored in the determination data storage part 49.

By way of example, the privacy masking determination part 50 determines to mask the privacy information when the distance between the current location of the provider terminal 2a and the current location of the browser terminal 2b is a short distance such as less than 10 m. That is because a malicious browser will likely do harm to the provider if the distance between the current location of the provider terminal 2a and the current location of the browser terminal 2b is a short distance.

On the other hand, the privacy masking determination part 50 determines not to mask the privacy information if the distance between the current location of the provider terminal 2a and the current location of the browser terminal 2b is a long distance such as 1 km or more. That is because a malicious browser will less likely do harm to the provider if the distance between the current location of the provider terminal 2a and the current location of the browser terminal 2b is a long distance.

The content editing part 51 edits the privacy information included in the content so that the privacy information is concealed from the browser when the privacy masking determination part 50 determines to mask the privacy information. This enables dynamic masking of the privacy information included in the content in accordance with the current location of the provider terminal 2a used by the provider of the content and the current location of the browser terminal 2b used by the browser who intends to browse the content.

Second Embodiment

In the first embodiment, an example has been described in which the privacy masking determination part determines whether to mask the created location information that is privacy information in accordance with the distance calculated based on the current location of the provider terminal and the current location of the browser terminal. In a second embodiment, an example will be described in which a privacy masking determination part determines whether to mask the created location information that is privacy information in accordance with the distance calculated based on the current location of the provider terminal, the current location of the browser terminal, and the created location of the content.

Figure 7:
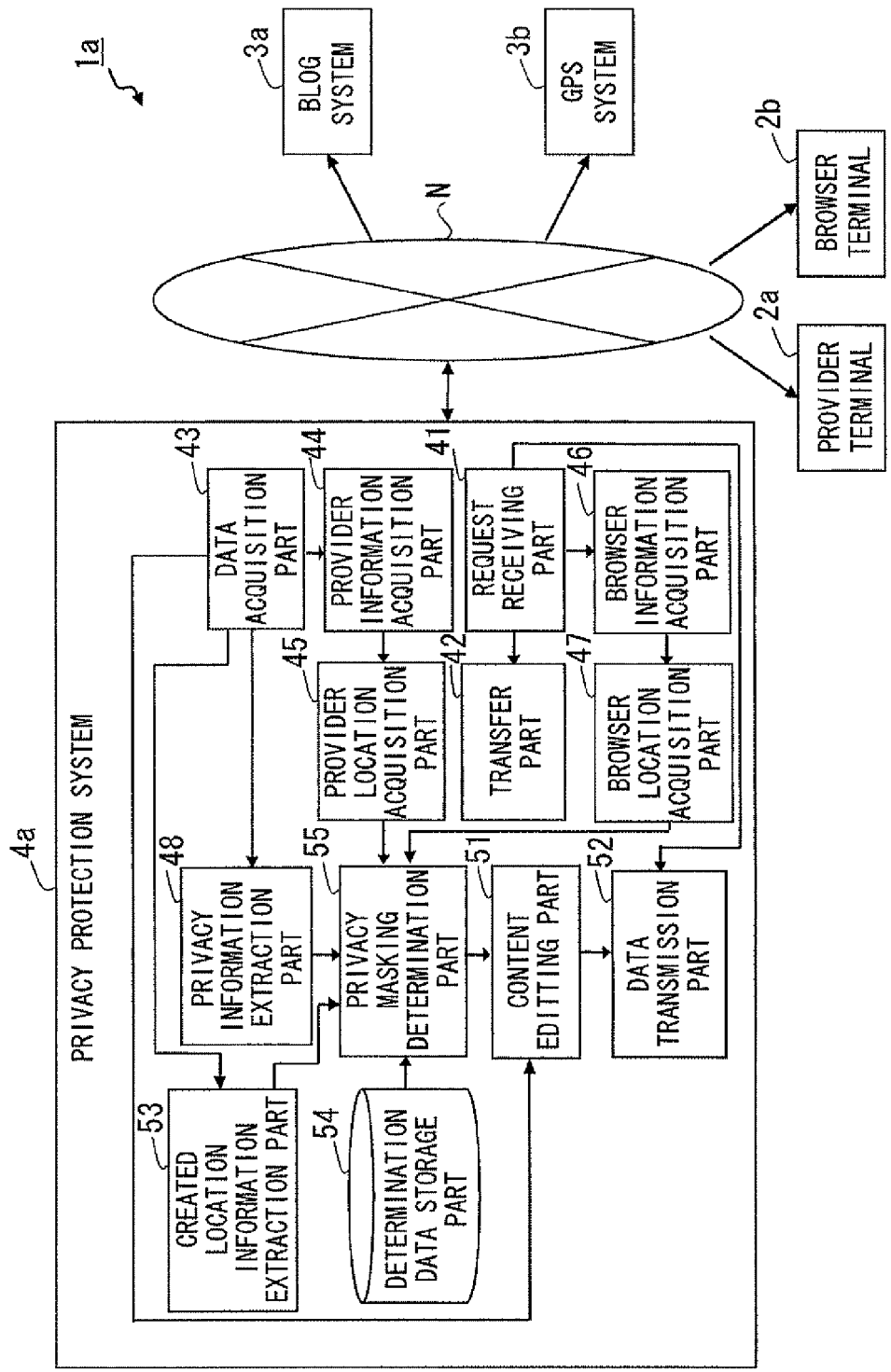
FIG. 7 is a block diagram showing a schematic configuration of a communication system according to a second embodiment of the present invention.

FIG. 7 is a block diagram showing a schematic configuration of a communication system 1a according to the present embodiment. The communication system 1a according to the present embodiment comprises a privacy protection system 4a in place of the privacy protection system 4 shown in FIG. 1. In FIG. 7, compositions having like functions as those in FIG. 1 are designated by the same reference numerals, and detailed descriptions thereof will be omitted.

The privacy protection system 4a comprises a created location information extraction part 53 in addition to the privacy protection system 4 shown in FIG. 1. The privacy protection system 4a comprises a determination data storage part 54 and a privacy masking determination part 55 in place of the determination data storage part 49 and the privacy masking determination part 50 shown in FIG. 1. The created location information extraction part 53 and the privacy masking determination part 55 are also embodied by the CPU of a computer operating in accordance with a program that realizes the functions.

The created location information extraction part 53 extracts the created location information from the additional information included in the content. When a plurality of contents exists, the created location information extraction part 53 extracts the created location information from the additional information included in each content. The created location information extraction part 53 outputs the extracted created location information to the privacy masking determination part 55.

The determination data storage part 54 stores the determination data serving as a standard for determining whether to mask the created location information that is privacy information. FIG. 8 schematically depicts an example of the determination data stored in the determination data storage part 54 according to the present embodiment.

In the example shown in FIG. 8, the determination data storage part 54 stores determination data indicating that the created location information is to be masked when the radius of a circle including the current location of the provider terminal 2a, the current location of the browser terminal 2b, and the created location of the content is less than 10 m. The determination data storage part 54 also stores determination data indicating that the created location information is to be masked when the radius of a circle including the current location of the provider terminal 2a, the current location of the browser terminal 2b, and the created location of the content is 10 m or more and less than 1 km. The determination data storage part 54 further stores determination data indicating that the created location information is not to be masked when the radius of a circle including the current location of the provider terminal 2a, the current location of the browser terminal 2b, and the created location of the content is 1 km or more.

The privacy masking determination part 55 determines whether to mask the privacy information outputted from the privacy information extraction part 48 by comparing the distance, which is calculated based on the current location of the provider terminal 2a indicated by the provider location information, the current location of the browser terminal 2b indicated by the browser location information, and the created location of the content indicated by the created location information, to the determination data stored in the determination data storage part 54.

Figure 9:
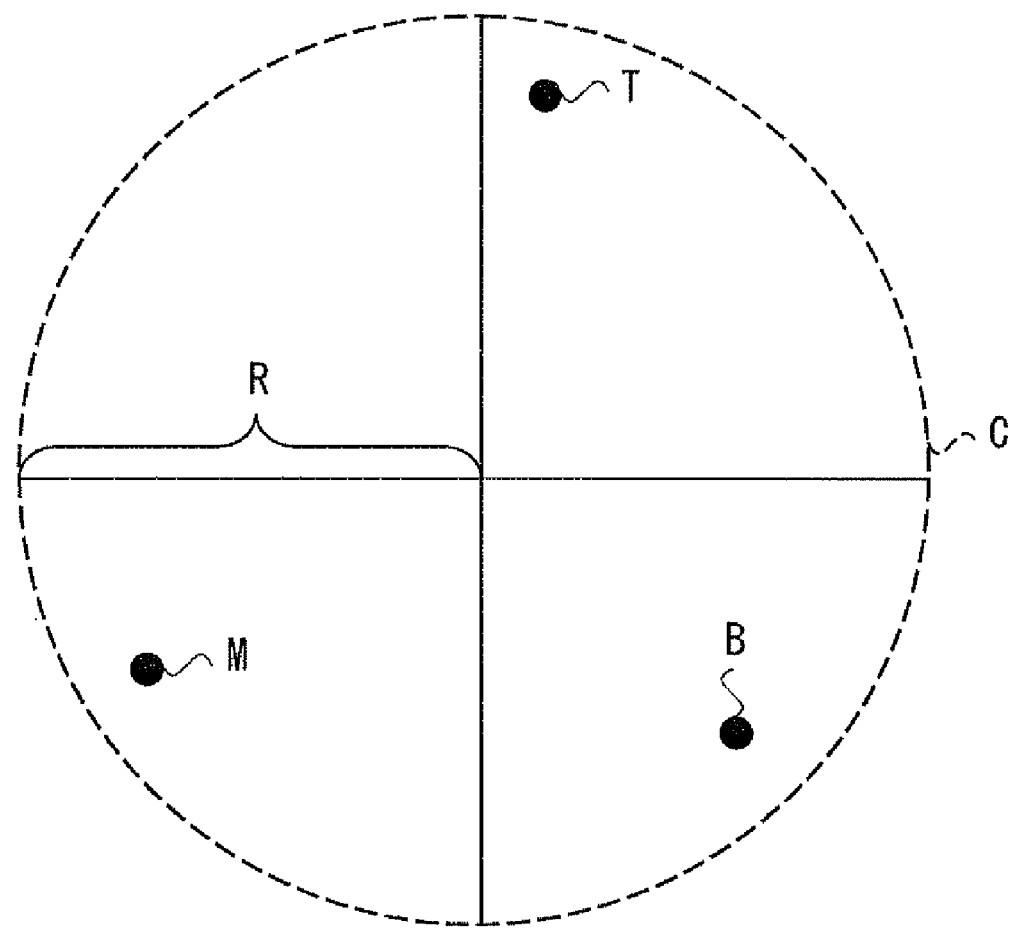
FIG. 9 is a schematic view showing a circle including the current location of a provider, the current location of a browser, and the created location of the content.

Specifically, the privacy masking determination part 55 depicts a circle C including a current location T of the provider terminal 2a, a current location B of the browser terminal 2b, and a created location M of the content, as shown in FIG. 9. The privacy masking determination part 55 calculates a radius R of the depicted circle C. The privacy masking determination part 55 determines whether there is privacy information that should be masked by comparing the calculated radius R to the determination data stored in the determination data storage part 54.

It is assumed that the calculated radius R is 150 m in the present embodiment. In this case, the privacy masking determination part 55 determines that, among the creator name information, the created time information, and the created location information outputted from the privacy information extraction part 48, the created location information is the privacy information that should be masked by comparing the calculated radius R, or 150 m, to the determination data shown in FIG. 8. The privacy masking determination part 55 outputs the privacy information determined to be masked (created location information) to the content editing part 51.

In the present embodiment, an example has been described in which the privacy masking determination part 55 determines whether there is privacy information that should be masked by depicting the circle C including the current location T of the provider terminal 2a, the current location B of the browser terminal 2b, and the created location M of the content and then comparing the radius R of the depicted circle C to the determination data shown in FIG. 8.

However, the present invention is not limited to this. For example, the privacy masking determination part 55 may be designed to determine whether there is privacy information that should be masked by calculating each of the distance between the current location T of the provider terminal 2a and the current location B of the browser terminal 2b, the distance between the current location T of the provider terminal 2a and the created location M of the content, and the distance between the current location B of the browser terminal 2b and the created location M of the content. Specifically, the privacy masking determination part 55 obtains the sum of the calculated distances. The privacy masking determination part 55 determines whether there is privacy information that should be masked by comparing the sum of the calculated distances to the determination data shown in FIG. 8.

As described, according to the privacy protection system 4a of the present embodiment, the privacy masking determination part 55 determines whether to mask the privacy information by comparing the distance, which is calculated based on the current location of the provider terminal 2a, the current location of the browser terminal 2b, and the created location of the content, to the determination data stored in the determination data storage part 54.

By way of example, the privacy masking determination part 55 determines to mask the privacy information if the current location of the provider terminal 2a, the current location of the browser terminal 2b, and the created location of the content are closely spaced, such as when the radius of a circle including the current location of the provider terminal 2a, the current location of the browser terminal 2b, and the created location of the content is less than 10 m. This is because a malicious browser will likely do harm to the provider if the current location of the provider terminal 2a, the current location of the browser terminal 2b, and the created location of the content are closely-spaced.

Meanwhile, the privacy masking determination part 55 determines not to mask the privacy information if the current location of the provider terminal 2a, the current location of the browser terminal 2b, and the created location of the content are remotely-space, such as when the radius of a circle including the current location of the provider terminal 2a, the current location of the browser terminal 2b, and the created location of the content is 1 km or more. This is because a malicious browser will less likely do harm to the provider if the current location of the provider terminal 2a, the current location of the browser terminal 2b, and the created location of the content are remotely-space. This enables dynamic masking of the privacy information included in the content in accordance with the current location of the provider terminal 2a used by the provider of the content, the current location of the browser terminal 2b used by the browser who intends to browse the content, and the created location of the content.

Third Embodiment

In the second embodiment, an example has been described in which the privacy masking determination part determines whether to mask the created location information that is privacy information in accordance with the distance calculated based on the current location of the provider terminal, the current location of the browser terminal, and the created location of the content. In a third embodiment, an example will be described in which a privacy masking determination part determines whether to mask the created time information that is privacy information in accordance with the distance, which is calculated based on the current location of the provider terminal and the current location of the browser terminal, and the elapsed time from the created time of the content to the current time.

FIG. 10 is a block diagram showing a schematic configuration of a communication system 1b according to the present embodiment. The communication system 1b according to the present embodiment comprises a privacy protection system 4b in place of the privacy protection system 4a shown in FIG. 7. In FIG. 10, compositions having like functions as those in FIG. 7 are designated by the same reference numerals, and detailed descriptions thereof will be omitted.

The privacy protection system 4b comprises a created time information extraction part 56 in place of the created location information extraction part 53 shown in FIG. 7. The privacy protection system 4b also comprises a determination data storage part 57 and a privacy masking determination part 58 in place of the determination data storage part 54 and the privacy masking determination part 55 shown in FIG. 7. The created time information extraction part 56 and the privacy masking determination part 58 are also embodied by the CPU of a computer operating in accordance with a program that realizes the functions.

The created time information extraction part 56 extracts the created time information from the additional information included in the content. When a plurality of contents exist, the created time information extraction part 56 extracts the created time information from the additional information included in each content. The created time information extraction part 56 outputs the extracted created time information to the privacy masking determination part 58.

The determination data storage part 57 stores the determination data serving as a standard for determining whether to mask the created time information that is privacy information. FIG. 11 schematically depicts an example of the determination data stored in the determination data storage part 57 according to the present embodiment. In the example shown in FIG. 11, the determination data storage part 57 stores the determination data indicating whether to mask the created time information based on the distance between the current location of the provider terminal 2a and the current location of the browser terminal 2b and the elapsed time from the created time of the content to the current time. In the present embodiment, "short time" in the elapsed time from the created time of the content to the current time denotes less than 30 minutes. "Middle time" denotes 30 minutes or more and less than one our. "Long time" denotes one hour or more.

The privacy masking determination part 58 determines whether to mask the privacy information outputted from the privacy information extraction part 48 by comparing the distance, which is calculated based on the current location of the provider terminal 2a indicated by the provider location information and the current location of the browser terminal 2b indicated by the browser location information, to the elapsed time from the created time of the content to the current time indicated by the created time information with the determination data stored in the determination data storage part 57.

Specifically, the privacy masking determination part 58 calculates the distance between the current location of the provider terminal 2a and the current location of the browser terminal 2b. The privacy masking determination part 58 calculates the difference between the created time of the content and the current time to calculate the elapsed time from the created time of the content to the current time. Therefore, the privacy masking determination part 58 comprises a current time calculation function. The privacy masking determination part 58 determines whether there is privacy information that should be masked by comparing the calculated distance and the calculated elapsed time to the determination data shown in FIG. 11.

In the present embodiment, it is assumed that the calculated distance is 8 m, and the elapsed time is 18 minutes. In this case, the privacy masking determination part 58 determines that, among the creator name information, the created time information, and the created location information outputted from the privacy information extraction part 48, the created time information is the privacy information that should be masked by collating the calculated distance 8 m and the calculated elapsed time 18 minutes to the determination data shown in FIG. 11. The privacy masking determination part 58 outputs the privacy information determined to be masked (created time information) to the content editing part 51.

As described, according to the privacy protection system 4b of the present embodiment, the privacy masking determination part 58 determines whether to mask the privacy information by comparing the distance, which is calculated based on the current location of the provider terminal 2a and the current location of the browser terminal 2b and the elapsed time from the created time of the content to the current time, to the determination data stored in the determination data storage part 57.

By way of example, the privacy masking determination part 58 determines to mask the privacy information if the distance between the current location of the provider terminal 2a and the current location of the browser terminal 2b is a short distance, such as less than 10 m, and the elapsed time from the created time of the content to the current time is a short time, such as less than 30 minutes. This is because a malicious browser will likely do harm to the provider if the distance between the current location of the provider terminal 2a and the current location of the browser terminal 2b is a short distance and the elapsed time from the created time of content to the current time is a short time.

On the other hand, the privacy masking determination part 58 determines not to mask the privacy information if the elapsed time from the created time of the content to the current time is a long distance, such as one hour or more, even when the distance between the current location of the provider terminal 2a and the current location of the browser terminal 2b is a short distance, such as less than 10 m. This is because a malicious browser will less likely do harm to the provider if the elapsed time from the created time of the content to the current time is a long time even when the distance between the current location of the provider terminal 2a and the current location of the browser terminal 2b is a short distance. This enables dynamic masking of the privacy information included in the content in accordance with the current location of the provider terminal 2a used by the provider of the content, the current location of the browser terminal 2b used by the browser who intends to browse the content, and the elapsed time from the created time of the content to the current time.

Fourth Embodiment

In the third embodiment, an example has been described in which the privacy masking determination part determines whether to mask the created time information that is privacy information in accordance with the distance, which is calculated based on the current location of the provider terminal and the current location of the browser terminal, and the elapsed time from the created time of the content to the current time. In a fourth embodiment, an example will be described in which a privacy masking determination part determines whether to mask the created time information and the created location information that are privacy information in accordance with the distance, which is calculated based on the route of daily activity of the provider and the current location of the browser, and the elapsed time from the created time of the content to the current time.

Figure 12:
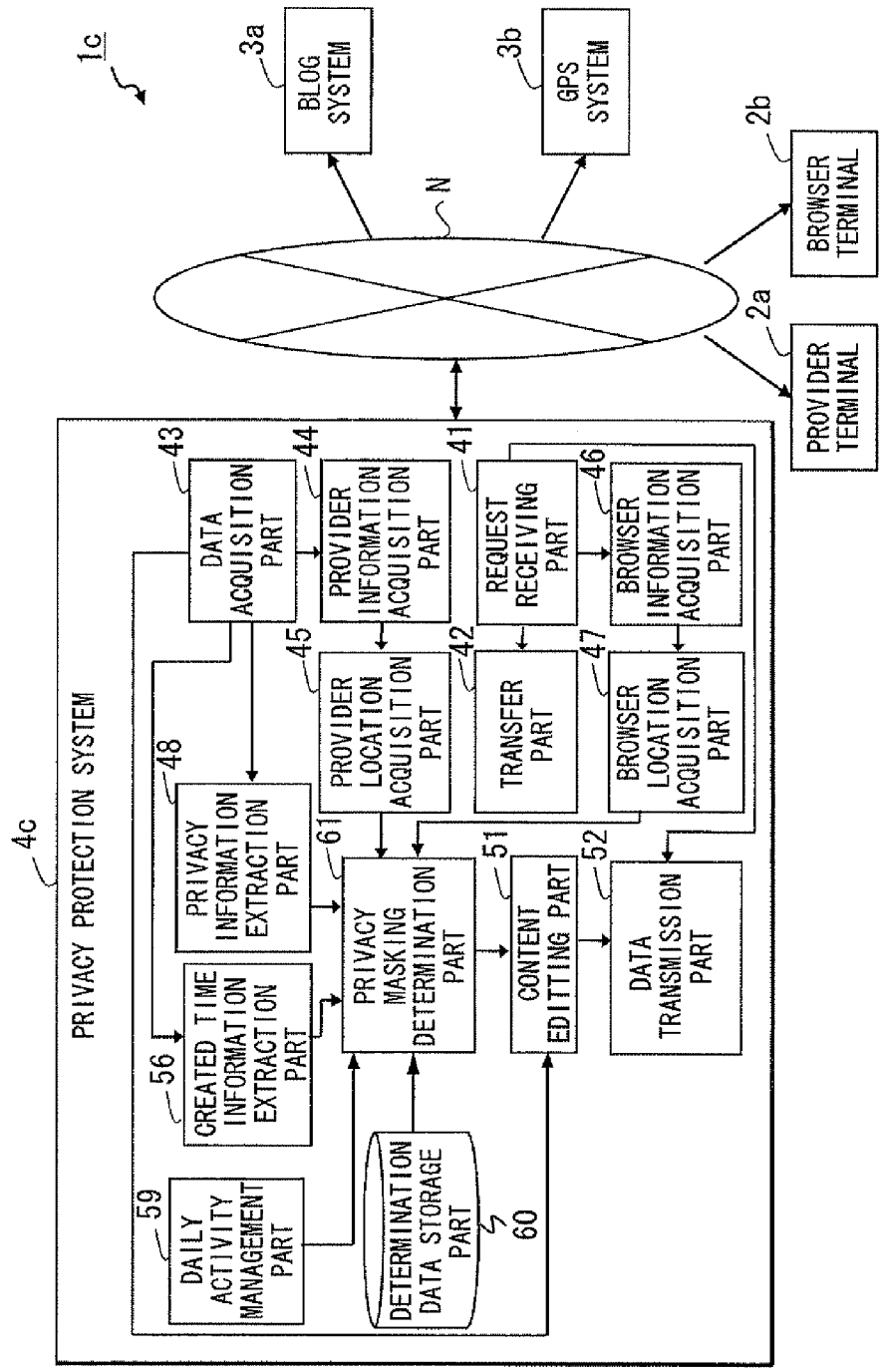
FIG. 12 is a block diagram showing a schematic configuration of a communication system according to a fourth embodiment of the present invention.

FIG. 12 is a block diagram showing a schematic configuration of a communication system 1c according to the present embodiment. The communication system 1c according to the present embodiment comprises a privacy protection system 4c in place of the privacy protection system 4b shown in FIG. 10. In FIG. 12, compositions having like functions as those in FIG. 10 are designed by the same reference numerals, and detailed descriptions thereof will be omitted.

The privacy protection system 4c comprises a daily activity management part 59 in addition to the privacy protection system 4b shown in FIG. 10. The privacy protection system 4c also comprises a determination data storage part 60 and a privacy masking determination part 61 in place of the determination data storage part 57 and the privacy masking determination part 58 shown in FIG. 10. The daily activity management part 59 and the privacy masking determination part 61 are also embodied by the CPU of a computer operating in accordance with a program that realizes the functions.

The daily activity management part 59 records the route of daily activity of the provider. Specifically, the daily activity management part 59 acquires provider location information from the GPS system 3b through the network N every certain period of time. The daily activity management part 59 records the acquired provider location information to a memory (not shown) of the daily activity management part 59. FIG. 13 schematically depicts an example of the provider location information recorded in the daily activity management part 59 according to the present embodiment.

As shown in FIG. 13, the daily activity management part 59 records the provider location information every five minutes. In the present embodiment, it is assumed that the location information "1111.2222, N, 3333.4444, E" denotes the center position of the provider's home. It is also assumed that the location information "8888.8888, N, 9999.0000, E" denotes the center position of office which is the place of work of the provider.

In the example shown in FIG. 13, a time frame T1 from 7 o'clock to 8 o'clock on Mar. 1, 2007 indicates that the current location of the provider is within a predetermined range (range of the building of the provider's home) from the center position of the provider's home. Therefore, the daily activity management part 59 determines that the provider had stayed home in the time frame T1.

A time frame T3 after 8:40 indicates that the current location of the provider is within a predetermined range (range of the building of the office) from the center position of the office. Therefore, the daily activity management part 59 determines that the provider had stayed at the office in the time frame T3. From this, the daily activity management part 59 determines that the provider had been commuting in a time frame T2 from 8:05 to 8:35.

In this way, the daily activity management part 59 monitors the activities of the provider in one day. The daily activity management part 59 determines whether activities of the provider in one day correspond to the activities indicated in prerecorded activity definition rules.

FIG. 14 schematically depicts one example of the activity definition rules recorded in the daily activity management part 59 according to the present embodiment. As shown in FIG. 14, the daily activity management part 59 records a rule that determines that the activity of the provider before commuting in the morning or after coming home in the evening or at night is "walking" when the current location of the provider indicates that the provider has left home and arrived home after a certain period of time without passing through anywhere.

The daily activity management part 59 also records a rule that determines that the activity of the provider in the morning is "commuting (going)" when the current location of the provider in the morning indicates that the provider has left home, passed through the nearest station, and arrived at the office after a certain period of time. The daily activity management part 59 further records a rule that determines that the activity of the provider is "commuting (returning)" when the current location of the provider from evening to night indicates that the provider has left the office or an enrichment class, passed through the nearest station, and arrived home after a certain period of time.

The daily activity management part 59 further records a rule that the activity of the provider from evening to night is "enrichment class" when the current location of the provider from evening to night indicates that the provider has left the office and arrived at the enrichment class after a certain period of time without passing through anywhere. The daily activity management part 59 further records a rule that determines that the activity of the provider is "shopping" when the current location of the provider indicates that the provider has left home, passed through a supermarket, and arrived home after a certain period of time.

In the present embodiment, the morning denotes 6:00 to 10:00, the evening denotes 16:00 to 19:00, and the night denotes 19:00 to 24:00. The administrator of the privacy protection system 4c can arbitrarily set up the activity definition rules recorded in the daily activity management part 59.

The daily activity management part 59 repeats the determination process for a month, for example. When the provider repeats the same activity in the same time frame in, for example, 20 days or more in the month, the daily activity management part 59 determines that the activity is a daily activity. When the provider repeats the same activity on predetermined days such as Mondays, Wednesdays, and Fridays in the month, the daily activity management part 59 determines that the activity is a daily activity.

The daily activity management part 59 outputs the determined route of daily activity to the privacy masking determination part 61.

In the present embodiment, an example has been described in which the daily activity management part 59 determines whether an activity is a daily activity by referring to the provider location information shown in FIG. 13 and the activity definition rules shown in FIG. 14. However, the present invention is not limited to this. For example, the provider may register the route of daily activity to the daily activity management part 59 in advance.

In addition to the determination data shown in FIG. 2 and the determination data shown in FIG. 11, the determination data storage part 60 stores determination data shown in FIG. 15. FIG. 15 schematically depicts an example of the determination data stored in the determination data storage part 60 according to the present embodiment. In the example shown in FIG. 15, the determination data storage part 60 stores determination data that indicates whether to mask the created location information and the created time information based on the distance between the route of daily activity of the provider and the current location of the browser terminal 2b and the elapsed time from the created time of the content to the current time.

The privacy masking determination part 61 first determines whether to mask the created location information that is privacy information by comparing the distance, which is calculated based on the current location of the provider terminal 2a indicated by the provider location information and the current location of the browser terminal 2b indicated by the browser location information, to the determination data shown in FIG. 2.

When determining not to mask the created location information that is privacy information, the privacy masking determination part 61 further determines whether to mask the created location information that is privacy information by comparing the distance, which is calculated based on the route of daily activity of the provider and the current location of the browser terminal 2b indicated by the browser location information, and the elapsed time from the created time of the content to the current time indicated by the created time information to the determination data shown in FIG. 15.

Figure 16:
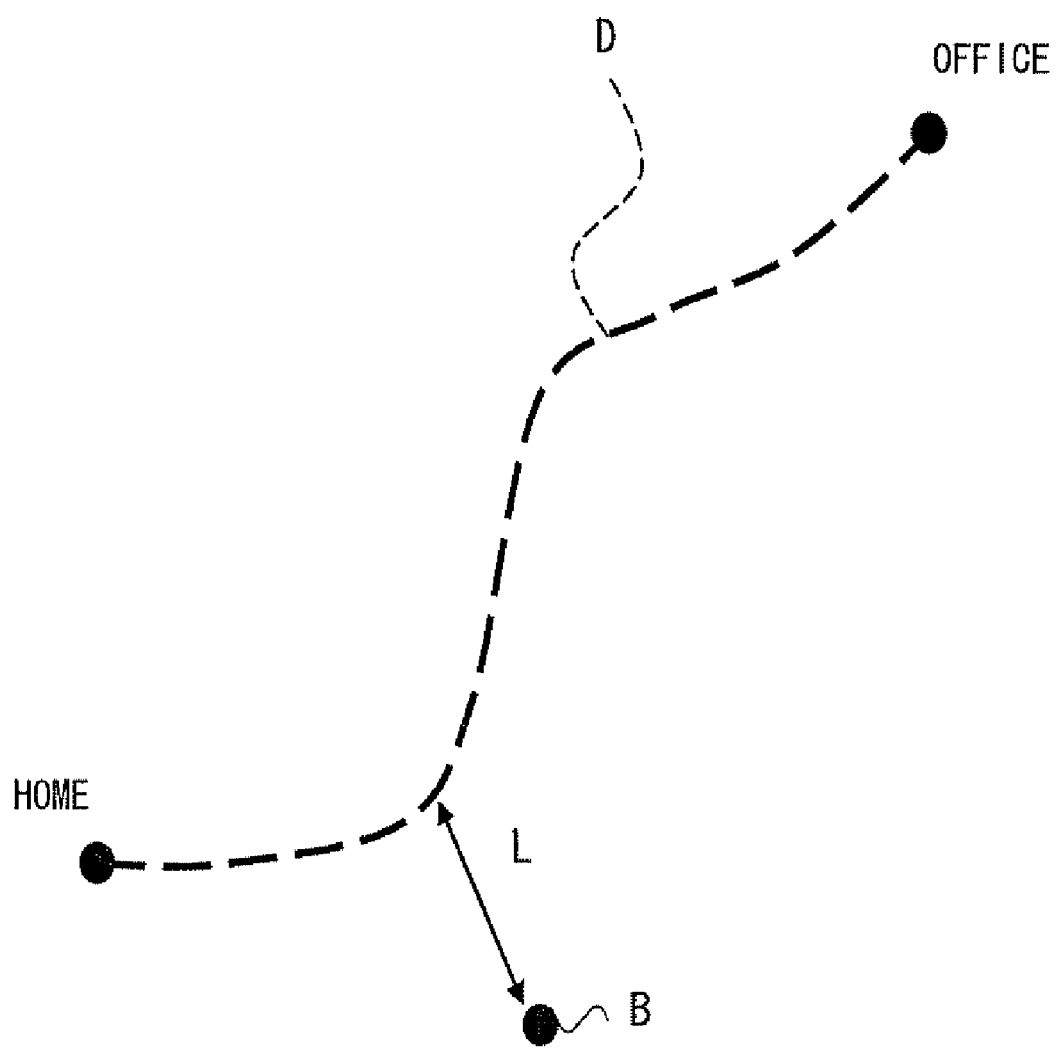
FIG. 16 is a schematic view showing the distance between the route of daily activity of the provider and the current location of the browser.

Specifically, as shown in FIG. 16, the privacy masking determination part 61 calculates a distance L between a route of daily activity D of the provider and a current location B of the browser terminal 2b. The privacy masking determination part 61 also calculates the difference between the created time of the content and the current time to calculate the elapsed time from the created time of the content to the current time.

The privacy masking determination part 61 determines whether to mask the created location information that is privacy information by comparing the calculated distance L and the calculated elapsed time to the determination data shown in FIG. 15. When determining to mask the created location information that is privacy information, the privacy masking determination part 61 outputs the privacy information determined to be masked (created location information) to the content editing part 51.

The privacy masking determination part 61 also determines whether to mask the created time information that is privacy information by comparing the distance, which is calculated based on the current location of the provider terminal 2a indicated by the provider location information and the current location of the browser terminal 2b indicated by the browser location information, and the elapsed time from the created time of the content to the current time indicated by the created time information to the determination data shown in FIG. 11.

When determining not to mask the created time information that is privacy information, the privacy masking determination part 61 further determines whether to mask the created time information that is privacy information by comparing the distance, which is calculated based on the route of daily activity of the provider and the current location of the browser terminal 2b indicated by the browser location information, and the elapsed time from the created time of the content to the current time to the determination data shown in FIG. 15. When determining to mask the created time information that is privacy information, the privacy masking determination part 61 outputs the privacy information determined to be masked (created time information) to the content editing part 51.

In this way, according to the privacy protection system 4c of the present embodiment, the privacy masking determination part 61 can determine to mask the privacy information even when, for example, the distance between the current location of the provider terminal 2a and the current location of the browser terminal 2b is a long distance, such as 1 km or more, as long as the distance between the route of daily activity of the provider and the current location of the browser terminal 2b is a short distance, such as less than 10 m.

Fifth Embodiment

In the fourth embodiment, an example has been described in which whether to mask the created time information and the created location information that are privacy information is determined in accordance with the distance, which is calculated based on the route of daily activity of the provider and the current location of the browser, and the elapsed time from the created time of the content to the current time. In a fifth embodiment, an example will be described in which a privacy masking determination part determines whether to mask the created location information that is privacy information in accordance with the distance calculated based on the area of the home ground where the provider stays on a daily basis and the current location of the browser.

Figure 17:
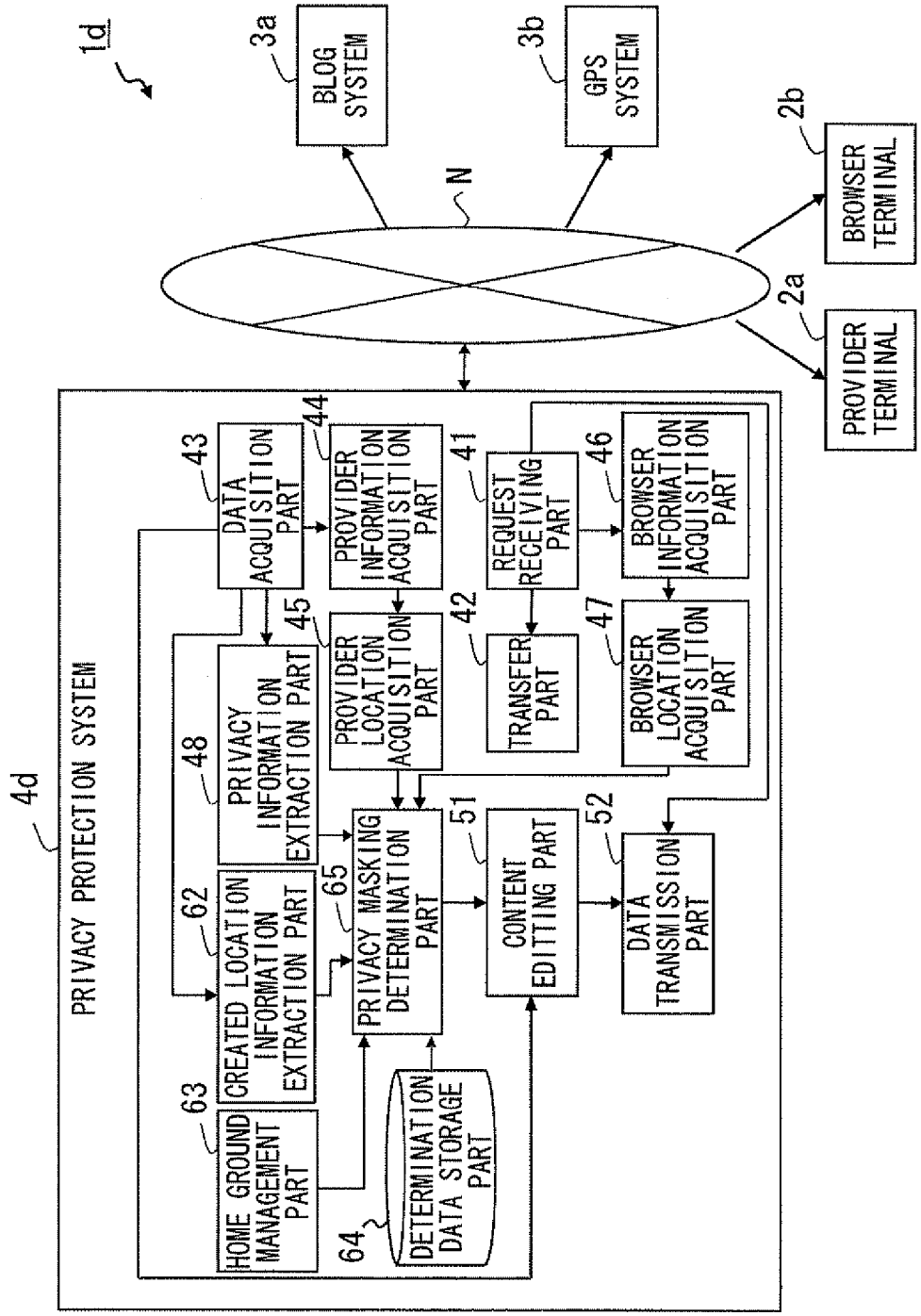
FIG. 17 is a block diagram showing a schematic configuration of a communication system according to a fifth embodiment of the present invention.

FIG. 17 is a block diagram showing a schematic configuration of a communication system 1d according to the present embodiment. The communication system 1d according to the present embodiment comprises a privacy protection system 4d in place of the privacy protection system 4c shown in FIG. 12. In FIG. 17, compositions having like functions as those in FIG. 12 are designated by the same reference numerals, and detailed descriptions thereof will be omitted.

The privacy protection system 4d comprises a created location information extraction part 62 in place of the created time extraction part 56 shown in FIG. 12.

The privacy protection system 4d also comprises a home ground management part 63 in place of the daily activity management part 59 shown in FIG. 12. The privacy protection system 4d further comprises a determination data storage part 64 and a privacy masking determination part 65 in place of the determination data storage part 60 and the privacy masking determination part 61 shown in FIG. 12. The created location information extraction part 62, the home ground management part 63, and the privacy masking determination part 65 are also embodied by the CPU of a computer operating in accordance with a program that realizes the functions.

Similar to the created location information extraction part 53 shown in FIG. 7, the created location information extraction part 62 extracts the created location information from the additional information included in the content. The created location information extraction part 62 outputs the extracted created location information to the privacy masking determination part 65.

The home ground management part 63 manages the area of the home ground where the provider stays on a daily basis. Specifically, the home ground management part 63 acquires the provider location information from the GPS system 3*b* through the network N every certain period of time. The home ground management part 63 calculates the place of stay where the provider has stayed for more than a certain period of time and the time of stay the provider has stayed at the place based on the acquired provider location information and then records the calculated place of stay and the time of stay in a memory (not shown) of the home ground management part 63.

FIG. 18 schematically depicts an example of the place of stay and the time of stay recorded in the home ground management part 63 according to the present embodiment. In the present embodiment, if the provider stays at a predetermined place for 30 minutes or more, the predetermined place and the time of stay the provider has stayed at the predetermined place are recorded in the home ground management part 63.

According to the example shown in FIG. 18, the current location of the provider is within the range of the building of the provider's home in the time frame from 0:00 to 07:10 on Apr. 1, 2007, and thus, the home ground management part 63 determines that the provider is staying at home. In the present embodiment, it is assumed that the range of the building of the provider's home is within 20 m from the center position of the provider's home.

The current location of the provider is within the range of the building of the office in the time frame from 8:35 to 19:25, and thus, the home ground management part 63 determines that the provider is staying at the office. In the present embodiment, it is assumed that the range of the building of the office is within 50 m from the center position of the office. The current location of the provider is within the range of the building of the enrichment class in the time frame from 20:00 to 22:15, and thus, the home ground management part 63 determines that the provider is staying at the enrichment class. In the present embodiment, it is assumed that the range of the building of the enrichment class is within 10 m of the center position of the enrichment class.

The home ground management part 63 repeats the determination process for a month, for example. When the provider has stayed at the same place for, for example, 20 days or more in the month, the home ground management part 63 determines that the place of stay is the home ground of the provider. When the provider has stayed at the same place on predetermined days such as Mondays, Wednesdays, and Fridays in the month, the home ground management part 63 determines that the place is the home ground of the provider.

The home ground management part 63 calculates the area of the determined home ground. For example, when the home ground is the provider's home, the range within 20 m from the center position of the provider's home is defined as the area of the home ground (range of the building of the providers home). The home ground management part 63 outputs the calculated area of the home ground to the privacy masking determination part 65.

In the present embodiment, an example has been described in which the home ground management part 63 determines whether a place is the home ground by referring to the place of stay indicated in FIG. 18. However, the present invention is not limited to this. For example, the provider may register the area of the home ground to the home ground management part 63 in advance.

The determination data storage part 64 stores determination data shown in FIG. 19 in addition to the determination data shown in FIG. 8. FIG. 19 schematically depicts an example of the determination data stored in the determination data storage part 64 according to the present embodiment. In the example shown in FIG. 19, the determination data storage part 64 stores determination data indicating that the created location information is to be masked when the current location of the browser terminal 2*b* is within the area of the home ground. The determination data storage part 64 also stores determination data indicating that the created location information is to be masked when the current location of the browser terminal 2*b* is outside the area of the home ground and the distance between the current location of the browser terminal 2*b* and the center position of the area of the home ground is less than 1 km.

The determination data storage part 64 further stores determination data indicating that the created location information is not to be masked when the current location of the browser terminal 2*b* is outside the area of the home ground and the distance between the current location of the browser terminal 2*b* and the center position of the area of the home ground is 1 km or more.

The privacy masking determination part 65 first determines whether to mask the created location information that is privacy information by comparing the distance, which is calculated based on the current location of the provider terminal indicated by the provider location information, the current location of the browser terminal indicated by the browser location information, and the created location of the content indicated by the created location information, to the determination data shown in FIG. 8.

When determining not to mask the created location information that is privacy information, the privacy masking determination part 65 further determines whether to mask the created location information that is privacy information by comparing the distance, which is calculated based on the area of the home ground and the current location of the browser terminal 2*b*, to the determination data shown in FIG. 19.

Figure 20:
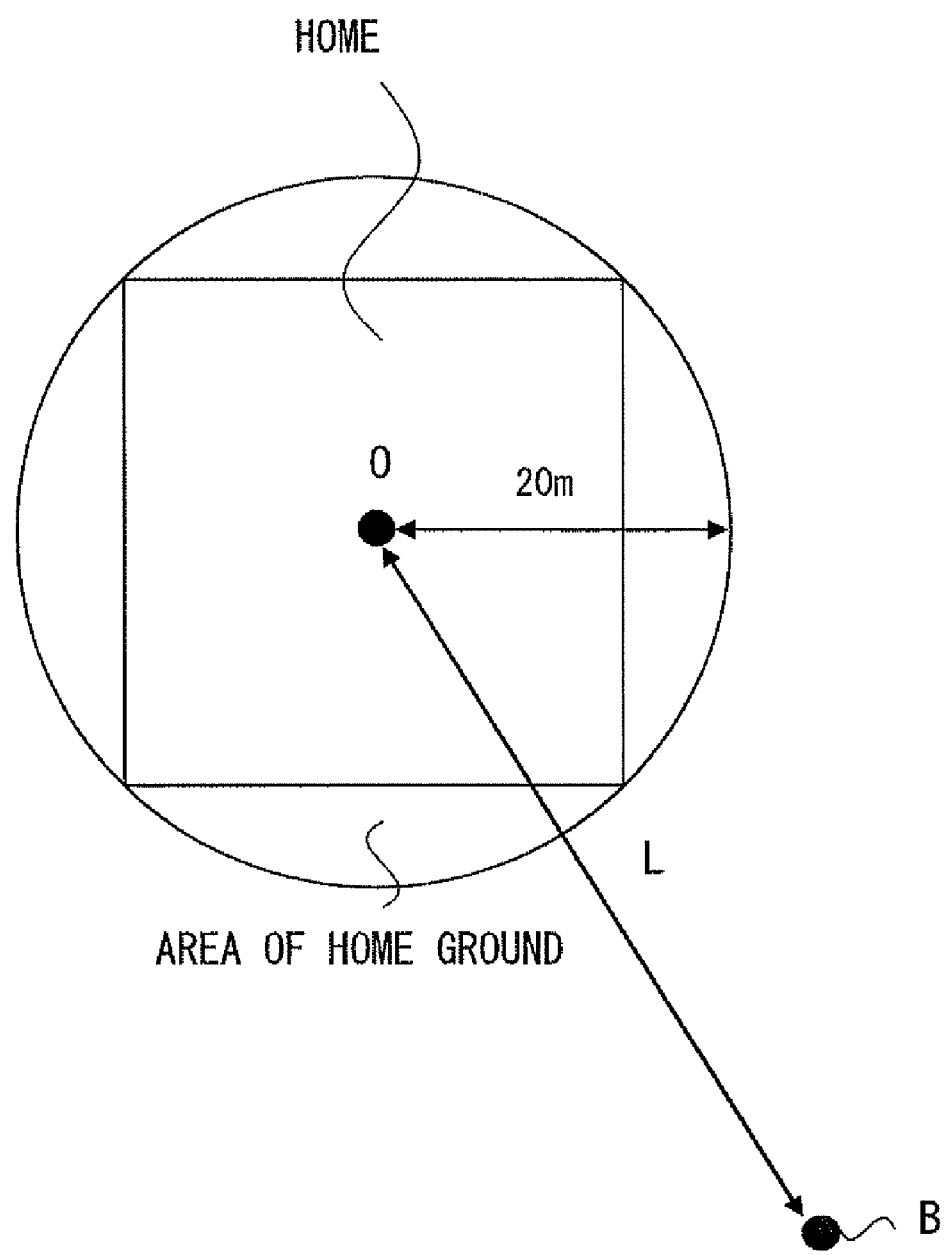
FIG. 20 is a schematic view showing the distance between the center position of the home ground of the provider and the current location of the browser.

Specifically, as shown in FIG. 20, the privacy masking determination part 65 calculates a distance L between a current location B of the browser and a center position O of the area of the home ground. In the example shown in FIG. 20, the distance L between the current location B of the browser and the center position O of the area of the home ground is greater than 20 m, and thus, the privacy masking determination part 65 determines that the current location of the browser terminal 2*b* is outside the area of the home ground. The privacy masking determination part 65 determines whether to mask the created location information that is privacy information by comparing the calculated distance L to the determination data shown in FIG. 19. When determining to mask the created location information that is privacy information, the privacy masking determination part 65 outputs the privacy information determined be masked (created location information) to the content editing part 51.

In this way, according to the privacy protection system 4d of the present embodiment, the privacy masking determination part 65 can determine to mask the privacy information as long as the current location of the provider terminal 2a is within the area of the home ground where the provider stays on a daily basis, even if the current location of the provider terminal 2a, the current location of the browser terminal 2b, and the created location of the content are remotely-space, such as when the radius of a circle including the current location of the provider terminal 2a, the current location of the browser terminal 2b, and the created location of the content is 1 km or more.

Sixth Embodiment

In the first to fifth embodiments, examples have been described in which the privacy masking determination part determines whether to mask the privacy information in accordance with the distance calculated based on the current location of the provider terminal and the current location of the browser terminal. In a sixth embodiment, an example will be described in which a privacy masking determination part determines whether to mask the privacy information depending on whether the provider and the browser are communicating.

FIG. 21 is a block diagram showing a schematic configuration of a communication system 1e according to the present embodiment. The communication system 1e according to the present embodiment comprises a chat system 3c and a call system 3d in addition to the communication system 1 shown in FIG. 1. The communication system 1e according to the present embodiment also comprises a privacy protection system 4e in place of the privacy protection system 4 shown in FIG. 1. In FIG. 21, compositions having like functions as those in FIG. 1 are designated by the same reference numerals, and detailed descriptions thereof will be omitted.

The chat system 3c is a system that manages a chat between the provider and the browser. In other words, the chat system 3c is a system that manages the exchange of text data conducted between the provider terminal 2a and the browser terminal 2b in real time. Therefore, the chat system 3c is, for example, an IRC (Internet Relay Chat) server.

The call system 3d is a system that controls the start, shift, and end of a phone call between the provider terminal 2a and the browser terminal 2b. Therefore, the call system 3d is constituted by, for example, a SIP (Session Initiation Protocol) server.

The privacy protection system 4e comprises a communication determination part 66 in addition to the privacy protection system 4 shown in FIG. 1. The privacy protection system 4e also comprises a determination data storage part 67 and a privacy masking determination part 68 in place of the determination data storage part 49 and the privacy masking determination part 50 shown in FIG. 1.

The communication determination part 66 and the privacy masking determination part 68 are also embodied by the CPU of a computer operating in accordance with a program that realizes the functions. The communication determination part 66 may be included in the privacy protection system 4a shown in FIG. 7, the privacy protection system 4b shown in FIG. 10, the privacy protection system 4c shown in FIG. 12, and the privacy protection system 4d shown in FIG. 17.

The communication determination part 66 determines whether the provider and the browser are communicating by referring to the contact history (communication record, record of provider and browser contacting, etc.) between the provider terminal 2a and the browser terminal 2b. Specifically, the communication determination part 66 accesses the chat system 3c through the network N. When the communication record of the chat system 3c indicates that the provider terminal 2a and the browser terminal 2b are exchanging the text data in real time, the communication determination part 66 determines that the provider and the browser are chatting and determines that the provider and the browser are communicating.

The communication determination part 66 also accesses the call system 3d through the network N, for example. When the communication record of the call system 3d indicates that the provider terminal 2a and the browser terminal 2b are exchanging voice data, the communication determination part 66 determines that the provider and the browser are talking on the phone and determines that the provider and the browser are communicating.

On the other hand, the communication determination part 66 determines that the provider and the browser are not communicating when the provider and the browser are not chatting or talking on the phone. The communication determination part 66 outputs the determination result to the privacy masking determination part 68.

In the present embodiment, an example has been described in which the communication determination part 66 determines whether the provider and the browser are communicating by accessing the chat system 3c and the call system 3d. However, the present invention is not limited to this. For example, the communication determination part 66 may be designed to determine whether the provider and the browser are communicating by referring to the communication record of the provider terminal 2a or the browser terminal 2b.

Specifically, detection programs 21a and 21b (not shown) are preinstalled on the provider terminal 2a and the browser terminal 2b to detect whether the provider terminal 2a and the browser terminal 2b are communicating with other terminals. The terminals 2a and 2b then monitor the operations of the communication programs of chatting, instant messaging, e-mailing, and the like, and record the communication status with the other terminals. The communication determination part 66 determines whether the provider and the browser are communicating by acquiring and analyzing the communication status recorded in the provider terminal 2a or the browser terminal 2b.

The communication determination part 66 may also be designed to determine whether the provider and the browser are communicating by accessing the GPS system 3b. Specifically, the communication determination part 66 acquires the provider location information and the browser location information from the GPS system 36. The communication determination part 66 determines that the provider and the browser are communicating when the current location of the provider terminal 2a and the current location of the browser terminal 2b are in the same location and there is an event or a reception in the location. The communication determination part 66 determines that the provider and the browser are communicating because the provider and the browser are participating in the same event or the same reception.

The communication determination part 66 may also be designed to determine whether any communication is conducted between the provider and the browser by accessing the GPS system 3b to acquire the current locations of the provider and the browser and by acquiring images photographed with a photograph device (camcorder, camera, or the like) (not shown) installed near the provider or the browser. Specifically, as described above, the communication determination part 66 acquires the provider location information and the browser location information from the GPS system 3b.

The communication determination part 66 further acquires the images photographed by the photograph device installed near the provider or the browser. The communication determination part 66 identifies the photographed individuals by recognizing the acquired images and further determines whether the identified individuals are having a conversation or, moreover, having a friendly conversation by recognizing face angles or expressions in the images. Alternatively, not only the images, but also voices may be acquired by a sound collection device (such as microphone) installed near the provider or the browser.

The communication determination part 66 can identify individuals by analyzing the acquired voices and may further be designed to determine the existence of a conversation from the frequency or timing of speech or to determine whether there is a friendly conversation from the tone or volume of voice.

The individual recognition described above is not limited to the image recognition or the voice recognition. An identifier, such as an IC tag, that can identify individuals may also be acquired for the determination.

Furthermore, recording the status of communication obtained from the acquired location information, images, voices, or the like in association with the acquired time enables to figure out the status of communication in time series. In this way, the communication determination part 66 can also determine to mask the privacy information when there were frequent communications in the past but few communications recently.

The determination data storage part 67 stores determination data serving as a standard for determining whether to mask the created location information that is privacy information. FIG. 22 schematically depicts an example of the determination data stored in the determination data storage part 67 according to the present embodiment. In the example shown in FIG. 22, the determination data storage part 67 stores determination data indicating whether to mask the created location information based on the distance between the current location of the provider terminal 2a and the current location of the browser terminal 2b and the presence of communication between the provider and the browser.

The privacy masking determination part 68 determines whether to mask the privacy information by comparing the distance, which is calculated based on the current location of the provider terminal 2a indicated by the provider location information and the current location of the browser terminal 2b indicated by the browser location information, to the determination result outputted from the communication determination part 66 with the determination data stored in the determination data storage part 67.

Specifically, the privacy masking determination part 68 calculates the distance between the current location of the provider terminal 2a and the current location of the browser terminal 2b. The privacy masking determination part 68 determines whether there is privacy information outputted from the privacy information extraction part 48 that should be masked by comparing the calculated distance and the determination result outputted from the communication determination part 66 to the determination data shown in FIG. 22.

In the present embodiment, it is assumed that the distance between the current location of the provider terminal 2a and the current location of the browser terminal 2b is 8 m. It is also assumed that the provider and the browser are not communicating in the present embodiment. In this case, the privacy masking determination part 68 determines that, among the creator name information, the created time information, and the created location information outputted from the privacy information extraction part 48, the created location information is the privacy information that should be masked by comparing the calculated distance 8 m and the nonexistence of communication to the determination data shown in FIG. 22. The privacy masking determination part 68 outputs the privacy information determined to be masked (created location information) to the content editing part 51.

As described, according to the privacy protection system 4e of the present embodiment, the privacy masking determination part 68 determines whether to mask the privacy information depending on whether the provider and the browser are communicating. As a result, for example, the privacy masking determination part 68 can determine to mask the privacy information if the provider and the browser are not communicating. On the other hand, for example, the privacy masking determination part 68 can determine not to mask the privacy information if the provider and the browser are communicating.

The privacy masking determination part 68 may be designed to determine to mask the privacy information if the provider and the browser are communicating. More specifically, when the browser is a person who follows the provider around relentlessly (so-called stalking), the communication between the provider and the browser can be considered stalking of the provider by the browser. Therefore, in such a case, the privacy masking determination part 68 determines to mask the privacy information.

Seventh Embodiment

In the sixth embodiment, an example has been described in which the privacy masking determination part determines whether to mask the privacy information depending on whether the provider and the browser are communicating. In a seventh embodiment, an example will be described in which a privacy masking determination part determines whether to mask the privacy information in accordance with the degree of intimacy between the provider and the browser.

FIG. 23 is a block diagram showing a schematic configuration of a communication system 1f according to the present embodiment. The communication system 1f according to the present embodiment comprises a mail system 3e in addition to the communication system 1e shown in FIG. 21. The communication system 1f according to the present embodiment also comprises a privacy protection system 4f in place of the privacy protection system 4e shown in FIG. 21. In FIG. 23, compositions having like function as those in FIG. 21 are designated by the same reference numerals, and the detailed descriptions thereof will be omitted.

The mail system 3e is a system that manages the transmission/reception of e-mail between the provider terminal 2a and the browser terminal 2b. Thus, the mail system 3e is constituted by, for example, an SMTP (Simple Mail Transfer Protocol) server and a POP (Post Office Protocol) server.

The privacy protection system 4f comprises an intimacy determination part 69 in place of the communication determination part 66 shown in FIG. 21. The privacy protection system 4f also comprises a determination data storage part 70 and a privacy masking determination part 71 in place of the determination data storage part 67 and the privacy masking determination part 68 shown in FIG. 21. The intimacy determination part 69 and the privacy masking determination part 71 are also embodied by the CPU of a computer operating in accordance with a program that realizes the functions. The intimacy determination part 69 may be included in the privacy protection system 4a shown in FIG. 7, the privacy protection system 4b shown in FIG. 10, the privacy protection system 4c shown in FIG. 12, and the privacy protection system 4d shown in FIG. 17.

The intimacy determination part 69 determines the communication mechanism and the frequency of communication between the provider and the browser by referring to the contact history (communication record, record of provider and browser contacting, or the like) between the provider terminal 2a and the browser terminals 2b. The intimacy determination part 69 determines the degree of intimacy by comparing the communication mechanism and the frequency of communication to prerecorded intimacy determination rules. FIG. 24 schematically depicts an example of the intimacy determination rules recorded in the intimacy determination part 69 according to the present embodiment.

As shown in FIG. 24, the intimacy determination part 69 records a rule that determines the degree of intimacy is "high" if the provider terminal 2a and the browser terminal 2b transmit/receive e-mail once or more a week. The intimacy determination part 69 also records a rule that determines the degree of intimacy is "medium" if the provider terminal 2a and the browser terminal 2b transmit/receive e-mail once or more a month.

The intimacy determination part 69 further records a rule that determines the degree of intimacy is "low" if the provider terminal 2a and the browser terminal 2b have transmitted/received e-mail five times or less in the past. Similarly, the intimacy determination part 69 records intimacy determination rules in the case where the communication mechanism is chatting and in the case where the communication mechanism is a phone. The intimacy determination part 69 outputs the determined degree of intimacy to the privacy masking determination part 71.

The privacy protection system 4f according to the present embodiment may be designed to comprise the home ground management part described in the fifth embodiment. This allows the intimacy determination part 69 to determine the degree of intimacy based on the area of the home ground of the provider and the area of the home ground of the browser. Specifically, the intimacy determination part 69 determines that the degree of intimacy is "high" if the area of the home ground of the provider and the area of the home ground of the browser are the same. The intimacy determination part 69 determines that the degree of intimacy is "medium" or "low" if the area of the home ground of the provider and the area of the home ground of the browser are different.

The determination data storage part 70 stores determination data serving as a standard for determining whether to mask the created location information that is privacy information. FIG. 25 schematically depicts an example of the determination data stored in the determination data storage part 70 according to the present embodiment. In the example shown in FIG. 25, determination data is stored, indicating whether to mask the created location information based on the distance between the current location of the provider terminal 2a and the current location of the browser terminal 2b.

The privacy masking determination part 71 determines whether to mask the privacy information by comparing the distance, which is calculated based on the current location of the provider terminal 2a indicated by the provider location information and the current location of the browser terminal 2b indicated by the browser location information, and the degree of intimacy outputted from the intimacy determination part 69 to the determination data stored in the determination data storage part 70.

Specifically, the privacy masking determination part 71 calculates the distance between the current location of the provider terminal 2a and the current location of the browser terminal 2b. The privacy masking determination part 71 determines whether there is privacy information outputted from the privacy information extraction part 48 that should be masked by comparing the calculated distance and the degree of intimacy outputted from the intimacy determination part 69 to the determination data shown in FIG. 25.

In the present embodiment, it is assumed that the distance between the current location of the provider and the current location of the browser is 8 m. It is also assumed that the degree of intimacy is "medium" in the present embodiment. In this case, the privacy masking determination part 71 determines that, among the creator name information, created time information, and the created location information outputted from the privacy information extraction part 48, the created location information is the privacy information that should be masked by comparing the calculated distance 8 m and the degree of intimacy "medium" to the determination data shown in FIG. 25. The privacy masking determination part 71 outputs the privacy information determined to be masked (created location information) to the content editing part 51.

As described, according to the privacy protection system 4f of the present embodiment, the privacy masking determination part 71 determines whether to mask the privacy information in accordance with the degree of intimacy calculated by the intimacy determination part 69. This allows the privacy masking determination part 71, for example, to determine to mask the privacy information if the degree of intimacy between the provider and the browser is low. On the other hand, the privacy masking determination part 71 can, for example, determine not to mask the privacy information if the degree of intimacy between the provider and the browser is high.

Eighth Embodiment

In the first to seventh embodiments, examples have been described in which the privacy masking determination part determines whether to mask the privacy information in accordance with the distance calculated based on the current location of the provider terminal and the current location of the browser terminal, as well as other data. In an eighth embodiment, an example will be described in which a privacy masking determination part determines whether to mask the privacy information in accordance with the result of the comparison of the determination data of the provider to the determination data of the browser.

Figure 26:
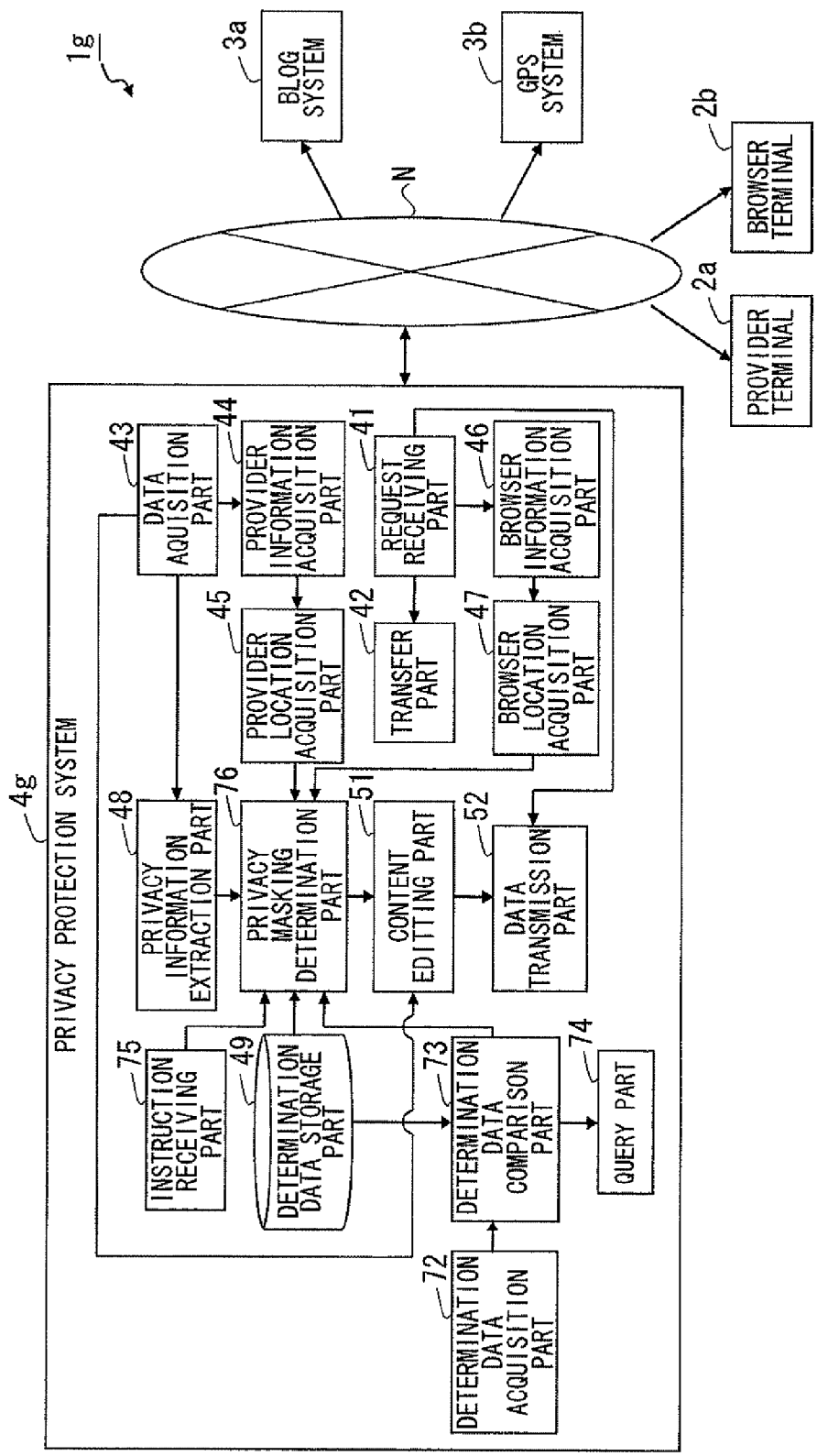
FIG. 26 is a block diagram showing a schematic configuration of a communication system according to an eighth embodiment of the present invention.
Figure 28:
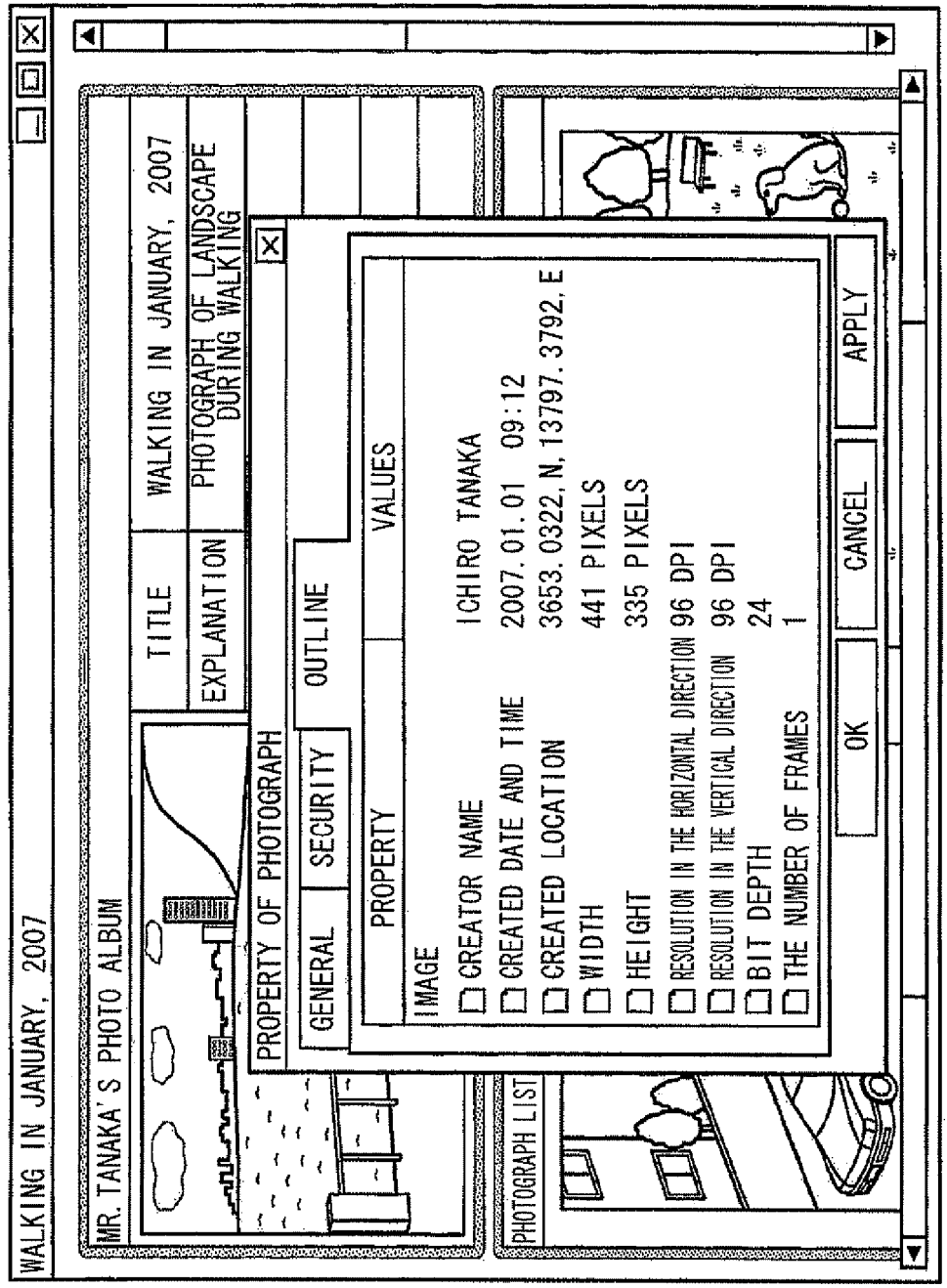
FIG. 28 is a schematic view showing an example of additional information of the content displayed on the browser terminal.

FIG. 26 is a block diagram showing a schematic configuration of a communication system 1g according to the present embodiment. The communication system 1g according to the present embodiment comprises a privacy protection system 4g in place of the privacy protection system 4 shown in FIG. 1. In FIG. 26, compositions having like functions as those in FIG. 1 are designated by the same reference numerals, and detailed descriptions thereof will be omitted.

The privacy protection system 4g comprises a determination data acquisition part 72, a determination data comparison part 73, a query part 74, and an instruction receiving part 75 in addition to the privacy protection system 4 shown in FIG. 1. The privacy protection system 4g also comprises a privacy masking determination part 76 in place of the privacy masking determination part 50 shown in FIG. 1.

The determination data acquisition part 72, the determination data comparison part 73, the query part 74, the instruction receiving part 75, and the privacy masking determination part 76 are also embodied by the CPU of a computer operating in accordance with a program that realizes the functions. The determination data acquisition part 72, the determination data comparison part 73, the query part 74, and the instruction receiving part 75 may be included in the privacy protection system 4a shown in FIG. 7, the privacy protection system 4b shown in FIG. 10, the privacy protection system 4c shown in FIG. 12, the privacy protection system 4d shown in FIG. 17, the privacy protection system 4e shown in FIG. 21, and the privacy protection system 4f shown in FIG. 23.

The determination data acquisition part 72 acquires the determination data of the browser. The determination data of the browser is data serving as a standard for determining whether to mask the privacy information related to the privacy of the browser. Specifically, the determination data acquisition part 72 acquires the determination data of the browser by accessing the browser terminal 2b.

The determination data acquisition part 72 may be designed to acquire the determination data of the browser by accessing another privacy protection system storing the determination data of the browser. In the present embodiment, it is assumed that the determination data acquisition part 72 has acquired the determination data of the browser shown in FIG. 27.

FIG. 27 indicates the determination data of the browser according to the present embodiment. Therefore, the provider terminal shown in FIG. 27 serves as the browser terminal according to the present embodiment, while the browser terminal shown in FIG. 27 serves as the provider terminal according to the present embodiment. The determination data acquisition part 72 outputs the acquired determination data of the browser to the determination data comparison part 73.

The determination data comparison part 73 compares the determination data of the provider stored in the determination data storage part 49 and the determination data of the browser outputted from the determination data acquisition part 72. In other words, the determination data comparison part 73 compares the determination data of the provider shown in FIG. 2 and the determination data of the browser shown in FIG. 27.

For example, when the distance between the provider terminal 2a and the browser terminal 2b is 20 m, the determination data comparison part 73 compares the determination data of the provider "mask" shown in FIG. 2 and the determination data of the browser "do not mask" shown in FIG. 27. As a result of the comparison, the determination data comparison part 73 determines that the disclosure level of the determination data of the browser "do not mask" is higher than that of the determination data of the provider "mask". Since the determination data of the browser is "do not mask", the determination data comparison part 73 instructs the query part 74 to query the provider whether to process the determination data of the provider "mask" as "do not mask".

For example, when the distance between the provider terminal 2a and the browser terminal 2b is 2 km, the determination data comparison part 73 compares the determination data of the provider "do not mask" shown in FIG. 2 and the determination data of the browser "mask" shown in FIG. 27. As a result of the comparison, the determination data comparison part 73 determines that the disclosure level of the determination data of the provider "do not mask" is higher than that of the determination data of the browser "mask". Since the determination data of the browser is "mask", the determination data comparison part 73 instructs the privacy masking determination part 76 to process the determination data of the provider "do not mask" as "mask".

The query part 74 transmits query data to the provider terminal 2a to query the provider whether to process the determination of the provider "mask" as "do not mask". In this case, the query part 74 transmits the information of the browser and the content included in the content indicated by the browser request to the provider terminal 2a. Consequently, the provider terminal 2a displays whether to process the determination data of the provider "mask" as "do not mask" along with the information of the browser and the targeted content.

In other words, the provider terminal 2a displays, for example, "Yes" indicating that "mask" is to be processed as "do not mask" and "No" indicating that "mask" is not to be processed as "do not mask". The provider instructs "Yes" or "No" displayed on the provider terminal 2a using an input device to thereby transmit the instruction data to the privacy protection system 4g.

The instruction receiving part 75 receives the instruction data transmitted from the provider terminal 2a. When the instruction data indicates that the determination data of the provider "mask" is to be processed as "do not mask", the instruction receiving part 75 instructs the privacy masking determination part 76 to process the determination data of the provider "mask" as "do not mask". On the other hand, when the instruction data indicates that the determination data of the provider "mask" is not to be processed as "do not mask", the instruction receiving part 75 does not instruct the privacy masking determination part 76.

The privacy masking determination part 76 determines whether to mask the privacy information outputted from the privacy information extraction part 48 based on the current location of the provider terminal 2a indicated by the provider location information, the current location of the browser terminal 2b indicated by the browser location information, the instruction from the determination data comparison part 73 or the instruction receiving part 75, and the determination data stored in the determination data storage part 49.

Specifically, the privacy masking determination part 76 calculates the distance between the current location of the provider terminal 2a and the current location of the browser terminal 2b. The privacy masking determination part 76 determines whether there is privacy information outputted from the privacy information extraction part 48 that should be masked by comparing the calculated distance to the determination data shown in FIG. 2.

The privacy masking determination part 76 determines that, among the creator name information, the created time information, and the created location information outputted from the privacy information extraction part 48, the created location information is the privacy information that should be masked when the distance between the provider terminal 2a and the browser terminal 2b is 20 m, for example. In this case, when instructed by the instruction receiving part 75 to process the determination data of the provider "mask" as "do not mask", the privacy masking determination part 76 shifts from the process of determining that the created location information is the privacy information that should be masked to the process of determining that there is no privacy information that should be masked.

The privacy masking determination part 76 determines that, among the creator name information, the created time information, and the created location information outputted from the privacy information extraction part 48, there is no privacy information that should be masked when the distance between the provider terminal 2a and the browser terminal 2b is 2 km, for example. When instructed by the determination data comparison part 73 to process the determination data of the provider "do not mask" as "mask", the privacy masking determination part 76 shifts from the process of determining that there is no privacy information that should be masked to the process of determining that the created location information is the privacy information that should be masked. The privacy masking determination part 76 outputs the privacy information determined to be masked to the content editing part 51.

As described, according to the privacy protection system 4g of the present embodiment, the determination data comparison part 73 compares the determination data of the provider and the determination data of the browser. The privacy masking determination part 76 determines whether to mask the privacy information in accordance with the result of the comparison by the determination data comparison part 73. This allows the privacy masking determination part 76 to lower the disclosure level of the determination data of the provider so that the disclosure level of the determination data of the provider becomes the same as the disclosure level of the determination data of the browser when, for example, the disclosure level of the determination data of the provider is higher than the disclosure level of the determination data of the browser.

Furthermore, the privacy masking determination part 76 can raise the disclosure level of the determination data of the provider so that the disclosure level of the determination data of the provider becomes the same as the disclosure level of the determination data of the browser when, for example, the disclosure level of the determination data of the browser is higher than the disclosure level of the determination data of the provider.

In the first to eighth embodiments, examples have been described in which the provider registers the photographed still images to the blog system 3a using the provider terminal 2a, and the browser transmits a browse request to the content registered in the blog system 3a using the browser terminal 2b. However, the present invention is not limited to this. For example, a homepage system for managing homepages may be employed in place of the blog system 3a. A mail system for managing transmission/reception of e-mail may also be employed in place of the blog system 3a.

The present invention is not intended to be limited to the first to eighth embodiments described above, but diverse modifications can be made within the scope indicated in the claims. Embodiments obtained by combining the technical means appropriately modified within the scope indicated in the claims are also included in the technical scope.

As described, the privacy protection device the privacy protection method, and the privacy protection program provide advantages in that the privacy information included in the content can be dynamically masked in accordance with the current location of the provider terminal used by the provider of the content and the current location of the browser terminal used by the browser who intends to browse the content.

As described, the present invention is useful as a privacy protection device, a privacy protection method, or a privacy protection program for protecting the privacy information from misuse by a browser who has browsed the content, the privacy information included in the content and related to the privacy of the provider.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A privacy protection device comprising:
a provider location acquirer acquiring provider location information indicating a current location of a provider terminal used by a provider of content;
a browser location acquirer acquiring browser location information indicating current location of a browser terminal used by a browser who intends to browse the content;
a determination data storage storing determination data serving as a standard for determining whether to mask privacy information included in the content;
a privacy masking determiner determining whether to mask the privacy information by comparing the distance, which is calculated based on the current location of the provider terminal indicated by the provider location information and the current location of the browser terminal indicated by the browser location information, to the determination data stored in the determination data storage;
a content editor editing the privacy information included in the content so that the privacy information is concealed from the browser when the privacy masking determiner determines to mask the privacy information; and
a transmitter transmitting the content edited by the content editor to the browser terminal.

2. The privacy protection device according to claim 1, further comprising:
a created location information extractor extracting created location information from the content, the created location information indicating the created location of the content;
wherein the privacy masking determiner determines whether to mask the privacy information by comparing the distance, which is calculated based on the current location of the provider terminal indicated by the provider location information, the current location of the browser terminal indicated by the browser location information, and the created location of the content indicated by the created location information, to the determination data stored in the determination data storage.

3. The privacy protection device according to claim 1, further comprising:
a created time information extractor extracting created time information from the content, the created time information indicating the created time of the content;
wherein the privacy masking determiner determines whether to mask the privacy information by comparing the distance, which is calculated based on the current location of the provider terminal indicated by the provider location information and the current location of the browser terminal indicated by the browser location information, and the elapsed time from the created time of the content to the current time indicated by the created time information to the determination data stored in the determination data storage.

4. The privacy protection device according to claim 1, further comprising:
a daily activity manager having an activity definition table recorded with the route of daily activity of the provider;
wherein the privacy masking determiner further determines whether to mask the privacy information by comparing the distance, which is calculated based on the route of daily activity of the provider and the current location of the browser terminal indicated by the browser location information, and the determination data stored in the determination data storage when determining not to mask the privacy information by comparing the distance, which is calculated based on the current location of the provider terminal indicated by the provider location information and the current location of the browser terminal indicated by the browser location information, to the determination data stored in the determination data storage.

5. The privacy protection device according to claim 2, further comprising:
a home ground manager recording an area of the home ground where the provider stays on a daily basis;
wherein the privacy masking determiner further determines whether to mask the privacy information by comparing the distance, which is calculated based on the area of the home ground and the current location of the browser terminal indicated by the browser location information, to the determination data stored in the determination data storage when determining not to mask the privacy information by comparing the distance, which is calculated based on the current location of the provider terminal indicated by the provider location information, the current location of the browser terminal indicated by the browser location information, and the created location of the content indicated by the created location information to the determination data stored in the determination data storage.

6. The privacy protection device according to claim 1, further comprising:
a communication determiner determining whether the provider and the browser are communicating by referring to the contact history between the provider terminal and the browser terminal;
wherein the privacy masking determiner determines whether to mask the privacy information depending on whether the provider and the browser are communicating.

7. The privacy protection device according to claim 1, further comprising:
an intimacy determiner determining the communication mechanism and the frequency of communication between the provider and the browser by referring to the contact history between the provider terminal and the browser terminal and then calculating the degree of intimacy between the provider and the browser based on the determined communication mechanism and the frequency of communication;
wherein the privacy masking determiner determines whether to mask the privacy information in accordance with the degree of intimacy calculated by the intimacy determiner.

8. The privacy protection device according to claim 1, further comprising:
a determination data acquirer acquiring the determination data of the browser serving as a standard for determining whether to mask the privacy information related to the privacy of the browser; and
a determination data comparator comparing the determination data of the provider stored in the determination data storage to the determination data of the browser acquired by the determination data acquirer;
wherein the privacy masking determiner determines whether to mask the privacy information in accordance with the result of the comparison by the determination data comparator.

9. The privacy protection device according to claim 1, wherein the content editor deletes the privacy information included in the content when the privacy masking determiner determines to mask the privacy information.

10. The privacy protection device according to claim 1,
wherein the privacy information is the created location information indicating the created location of the content; and
wherein when a plurality of the contents exist and if the privacy masking determiner determines to mask the privacy information, the content editor extracts the created location information from each content, calculates an area that includes all created locations of the content indicated by the extracted created location information, generates new location information specifying the area, and replaces the created location information included in the content with the newly generated location information.

11. The privacy protection device according to claim 1,
wherein the privacy information is the created location information indicating the created location of the content; and
wherein the content editor replaces the created location information included in the content with location information of an arbitrary landmark when the privacy masking determiner determines to mask the privacy information.

12. A privacy protection method comprising:
acquiring provider location information indicating a current location of a provider terminal running on a processor and used by a provider of content;
acquiring browser location information indicating a current location of a browser terminal used by a browser who intends to browse the content;
storing a standard in a determination data storage;
calculating a distance between the current location of the provider terminal indicated by the provider location information and the current location of the browser terminal indicated by the browser location information;
determining whether to mask the privacy information by comparing the distance to the standard;
editing the privacy information included in the content so that the privacy information is concealed from the browser when the privacy information is determined to be masked; and
transmitting the edited content to the browser terminal.

13. A computer-readable storage medium storing a privacy protection program, the privacy protection program causing a computer to function with:
acquiring provider location information indicating a current location of a provider terminal used by a provider of content;
acquiring browser location information indicating a current location of a browser terminal used by a browser who intends to browse the content;
storing a standard in a determination data storage;
calculating a distance between the current location of the provider terminal indicated by the provider location information and the current location of the browser terminal indicated by the browser location information;
determining whether to mask the privacy information by comparing the distance to the standard;
editing the privacy information included in the content so that the privacy information is concealed from the browser when the privacy information is determined to be masked; and
transmitting the edited content to the browser terminal.

* * * * *